United States Patent
Fedurco et al.

(10) Patent No.: US 11,306,229 B2
(45) Date of Patent: *Apr. 19, 2022

(54) POLYBENZOXAZINE THAT CAN BE USED FOR COATING METAL AND FOR THE BONDING OF SAME TO RUBBER

(71) Applicant: COMPAGNIE GENERALE DES ETABLISSEMENTS MICHELIN, Clermont-Ferrand (FR)

(72) Inventors: Milan Fedurco, Clermont-Ferrand (FR); Marco Ribezzo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 362 days.

This patent is subject to a terminal disclaimer.

(21) Appl. No.: 16/345,310

(22) PCT Filed: Sep. 25, 2017

(86) PCT No.: PCT/FR2017/052565
§ 371 (c)(1),
(2) Date: Apr. 26, 2019

(87) PCT Pub. No.: WO2018/078227
PCT Pub. Date: May 3, 2018

(65) Prior Publication Data
US 2019/0300765 A1    Oct. 3, 2019

(30) Foreign Application Priority Data

Oct. 26, 2016   (FR) ........................ 1660376

(51) Int. Cl.
| | |
|---|---|
| C09J 165/00 | (2006.01) |
| B32B 15/08 | (2006.01) |
| B32B 15/18 | (2006.01) |
| B32B 15/20 | (2006.01) |
| B60C 1/00 | (2006.01) |
| B60C 9/00 | (2006.01) |
| C08G 61/12 | (2006.01) |
| C09J 5/00 | (2006.01) |
| C08G 73/02 | (2006.01) |
| C09J 179/04 | (2006.01) |
| C09D 179/04 | (2006.01) |
| C08G 14/06 | (2006.01) |

(52) U.S. Cl.
CPC ............ *C09J 165/00* (2013.01); *B32B 15/08* (2013.01); *B32B 15/18* (2013.01); *B32B 15/20* (2013.01);
(Continued)

(58) Field of Classification Search
CPC .... C08G 73/22; C08G 73/02; C08G 73/0233; C08G 73/024; C08G 73/06;
(Continued)

(56) References Cited

U.S. PATENT DOCUMENTS

| | | | |
|---|---|---|---|
| 5,543,516 A | 8/1996 | Ishida | |
| 7,649,060 B2 | 1/2010 | Li et al. | |
| 9,499,666 B2 | 11/2016 | Ward et al. | |
| 9,617,372 B2 | 4/2017 | Fedurco et al. | |
| 9,840,644 B2 | 12/2017 | Doisneau et al. | |
| 9,845,376 B2 | 12/2017 | Fedurco et al. | |

(Continued)

FOREIGN PATENT DOCUMENTS

| | | |
|---|---|---|
| JP | 2010-265480 A | 11/2010 |
| JP | 2011-16787 A | 1/2011 |

(Continued)

OTHER PUBLICATIONS

JP2011016787 English Machine Translation, prepared Jun. 19, 2021. (Year: 2021).*

(Continued)

*Primary Examiner* — Christopher M Rodd
(74) *Attorney, Agent, or Firm* — Venable LLP

(57) ABSTRACT

Polybenzoxazine comprises repeat units which comprise at least one unit corresponding to the formulae (I) or (II):

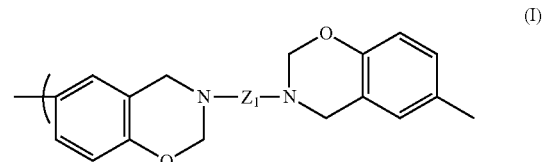

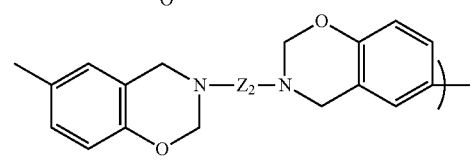

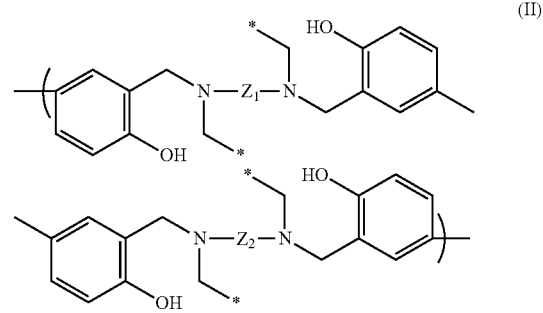

in which $Z_1$ and $Z_2$, which are identical or different, represent an at least divalent, aliphatic, cycloaliphatic or aromatic bonding group comprising at least one carbon atom and optionally at least one heteroatom selected from O, S, N and P. Such a polybenzoxazine may be used as a metal-adhesive layer, in particular for the adhesive bonding of a metal substrate, in particular made of carbon steel, to a rubber.

11 Claims, 22 Drawing Sheets

(52) U.S. Cl.
CPC .............. B60C 1/00 (2013.01); B60C 9/0007 (2013.01); C08G 14/06 (2013.01); C08G 61/122 (2013.01); C08G 73/0233 (2013.01); C09D 179/04 (2013.01); C09J 5/00 (2013.01); C09J 179/04 (2013.01); *B32B 2255/06* (2013.01); *B32B 2255/205* (2013.01); *B32B 2255/26* (2013.01); *B60C 2001/0075* (2013.01); *B60C 2009/0021* (2013.01); *C08G 2261/11* (2013.01); *C08G 2261/3245* (2013.01); *C08G 2261/334* (2013.01); *C08G 2261/3326* (2013.01); *C08G 2261/344* (2013.01); *C08G 2261/42* (2013.01); *C09J 2400/166* (2013.01); *C09J 2421/008* (2013.01)

(58) Field of Classification Search
CPC .. C08G 73/1046; C08G 61/12; C08G 61/122; C08G 2261/11; C08G 2261/3245; C08G 2261/3326; C08G 2261/334; C08G 2261/344; C08G 2261/42; C09J 2421/008; C09J 2400/166; C09J 179/02; C09J 179/04; C09J 179/06; C09J 179/08; C09J 5/00; C09D 179/02; C09D 179/04; C09D 179/06; C09D 179/08; B60C 2009/0021; B60C 2001/0075; B60C 9/0007; B60C 1/00; B32B 2255/06; B32B 2255/205; B32B 2255/26; B32B 15/08; B32B 15/18; B32B 15/20
See application file for complete search history.

(56) References Cited

U.S. PATENT DOCUMENTS

| | | | |
|---|---|---|---|
| 10,005,929 | B2 | 6/2018 | Doisneau et al. |
| 10,040,976 | B2 | 8/2018 | Doisneau et al. |
| 10,150,833 | B2 | 12/2018 | Fedurco et al. |
| 10,800,795 | B2 | 10/2020 | Fedurco et al. |
| 10,975,044 | B2 | 4/2021 | Fedurco et al. |
| 10,995,076 | B2 | 5/2021 | Fedurco et al. |
| 2003/0023007 | A1 | 1/2003 | Reardon |
| 2007/0129509 | A1 | 6/2007 | Li et al. |
| 2009/0137434 | A1* | 5/2009 | Kurihara ............ C08G 73/02 508/246 |
| 2009/0187003 | A1* | 7/2009 | Eguchi ............... C08L 79/04 528/403 |
| 2013/0267659 | A1 | 10/2013 | Ward et al. |
| 2014/0235124 | A1 | 8/2014 | Doisneau et al. |
| 2014/0235125 | A1 | 8/2014 | Doisneau et al. |
| 2014/0308864 | A1 | 10/2014 | Doisneau et al. |
| 2015/0259463 | A1 | 9/2015 | Fedurco et al. |
| 2015/0274878 | A1 | 10/2015 | Fedurco et al. |
| 2016/0122460 | A1 | 5/2016 | Fedurco et al. |
| 2016/0251550 | A1 | 9/2016 | Michoud et al. |
| 2017/0327973 | A1 | 11/2017 | Hatori et al. |
| 2018/0118983 | A1 | 5/2018 | Doisneau et al. |
| 2018/0370284 | A1 | 12/2018 | Fedurco et al. |
| 2020/0095458 | A1 | 3/2020 | Fedurco et al. |
| 2020/0199112 | A1 | 6/2020 | Fedurco et al. |
| 2020/0208010 | A1 | 7/2020 | Fedurco et al. |
| 2020/0290402 | A1 | 9/2020 | Fedurco et al. |
| 2021/0146725 | A1 | 5/2021 | Fedurco et al. |

FOREIGN PATENT DOCUMENTS

| | | | |
|---|---|---|---|
| JP | 2011016787 | A * | 1/2011 |
| JP | 2013-43950 | A | 3/2013 |
| WO | 2007/064801 | A1 | 6/2007 |
| WO | 2013/017421 | A1 | 2/2013 |
| WO | 2013/017422 | A1 | 2/2013 |
| WO | 2013/017423 | A1 | 2/2013 |
| WO | 2013/148408 | A1 | 10/2013 |
| WO | 2014/063963 | A2 | 5/2014 |
| WO | 2014/063968 | A1 | 5/2014 |
| WO | 2014/173838 | A1 | 10/2014 |
| WO | 2014/173839 | A1 | 10/2014 |
| WO | 2015/007641 | A1 | 1/2015 |
| WO | 2015/007642 | A1 | 1/2015 |
| WO | 2016/088663 | A1 | 6/2016 |

OTHER PUBLICATIONS

N.N. Ghosh et al., "Polybenzoxazines—New high performance thermosetting resins: Synthesis and properties", Prog. Polym. Sci. 32 (2007) 1344-1391.

Y. Yagci et al., "Recent Advancement on Polybenzoxazine—A Newly Developed High Performance Thermoset", J. Polym. Sci.: Part A: Polymer Chemistry, vol. 47, 5565-5576 (2009).

International Search Report dated Nov. 30, 2017, in corresponding PCT/FR2017/05265 (6 pages).

Co-Pending U.S. Appl. No. 16/345,304, available on USPTO system.

Co-Pending U.S. Appl. No. 16/062,990, available on USPTO system.

S. Li, et al., "Synthesis, characterization, and polymerization of brominated benzoxazine monomers and thermal stability/flame retardance of the polymers generated", Polym. Adv. Technol., vol. 21, No. 4, pp. 229-234 (2010).

M. Poorteman, et al., "Thermal curing of para-phenylenediamine benzoxazine for barrier coating applications on 1050 aluminum alloys", Progress in Organic Coatings, Elsevier BV, NL, vol. 97, pp. 99-109 (2016) XP029557542.

* cited by examiner

Fig. 1
Fig. 1a
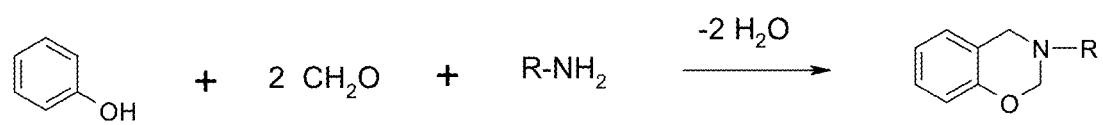
Fig. 1b
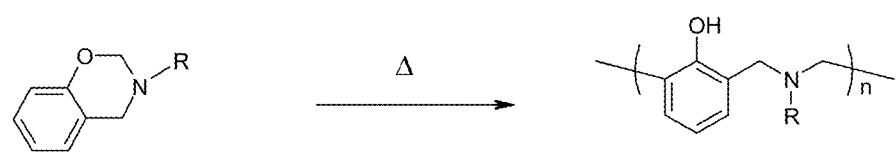

Monomer M

Monomer M-1

Monomer M-2

Monomer M-3

Monomer M-4

Monomer M-5

Monomer M-6

Polymer P-3

Monomer M-10

Monomer M-10

Compound 1           Compound 4           Compound 3

(A-12)

Monomer M-12

Compound 5        Compound 4        Compound 3

(I-6)

Polymer P-6

POLYBENZOXAZINE THAT CAN BE USED FOR COATING METAL AND FOR THE BONDING OF SAME TO RUBBER

1. FIELD OF THE INVENTION

The present invention relates to thermosetting resins, which can be used in particular in adhesive systems intended in particular for the adhesive bonding of metal to rubber.

The invention relates more particularly to the polymers having benzoxazine units or "polybenzoxazines" that can be used in particular as adhesive layers in metal/rubber composites intended for the manufacture of rubber articles such as pneumatic or non-pneumatic tyres, for motor vehicles.

2. PRIOR ART

Metal/rubber composites, in particular for motor vehicle tyres, are well known. They are usually composed of a matrix made of unsaturated rubber, generally diene rubber, which can be crosslinked with sulfur, comprising metal reinforcing elements (or "reinforcers") such as wires, films, tapes or cords made of carbon steel.

As they are subjected to very high stresses during the running of the tyres, especially to repeated actions of compression, bending or variation in curvature, these composites must, in a known way, satisfy a large number of sometimes contradictory technical criteria, such as uniformity, flexibility, flexural strength and compressive strength, tensile strength, wear resistance and corrosion resistance, and must maintain this performance at a very high level for as long as possible.

It is easily understood that the adhesive interphase between rubber and reinforcers plays a predominant role in the endurance of this performance. The conventional process for connecting the rubber compositions to carbon steel consists in coating the surface of the steel with brass (copper/zinc alloy), the bonding between the steel and the rubber matrix being provided by sulfurization of the brass during the vulcanization or curing of the rubber. In order to improve the adhesion, use is generally made, in addition, in these rubber compositions, of organic salts or metal complexes, such as cobalt salts, as adhesion-promoting additives.

In point of fact, it is known that the adhesion between the carbon steel and the rubber matrix is capable of weakening over time as a result of the gradual development of sulfides formed under the effect of the various stresses encountered, especially mechanical and/or thermal stresses, it being possible for the above decomposition process to be accelerated in the presence of moisture. Moreover, the use of cobalt salts renders the rubber compositions more sensitive to oxidation and to ageing, and significantly increases the cost thereof, not to mention that it is desirable to eliminate, in the long run, the use of such cobalt salts in rubber compositions due to the recent change in European regulations relating to metal salts of this type.

For all the reasons set out above, manufacturers of metal/rubber composites, in particular motor vehicle tyre manufacturers, are seeking novel adhesive solutions in order to adhesively bond metal reinforcers to rubber compositions, while overcoming, at least in part, the abovementioned disadvantages.

Thus, the recently published applications WO 2014/063963, WO 2014/063968, WO 2014/173838, WO 2014/173839, filed by the applicant companies, have described novel polymers with urea, urethane or thiourea units, and also the initial monomers thereof, which meet the above objectives. Used in particular as adhesion primer on metal in metal/rubber composites, these polymers make it possible very advantageously to adhesively bond the metal to the rubber matrices by subsequently using simple textile adhesives, such as "RFL" (resorcinol/formaldehyde latex) adhesives or other equivalent adhesive compositions, or else directly (that is to say, without employing such adhesives) to these rubber matrices when the latter contain, for example, appropriate functionalized unsaturated elastomers, such as epoxidized elastomers. Thus, the cobalt salts (or other metal salts) can in particular be dispensed with in the rubber compositions intended to be connected to brass-coated metal reinforcers.

In continuing their research, the applicant companies have found a novel polymer, of thermosetting type, which at ambient temperature has the same adhesive performance, with respect to metal and rubber, as the aforementioned polymers but which has, once thermoset (crosslinked), further improved thermal and chemical stability. Moreover, its specific microstructure makes it possible very advantageously to adjust the flexibility of the molecule depending on the particular applications targeted.

3. BRIEF DESCRIPTION OF THE INVENTION

The present invention relates to a polybenzoxazine comprising at least repeat units comprising at least one unit corresponding to the formulae (I) or (II):

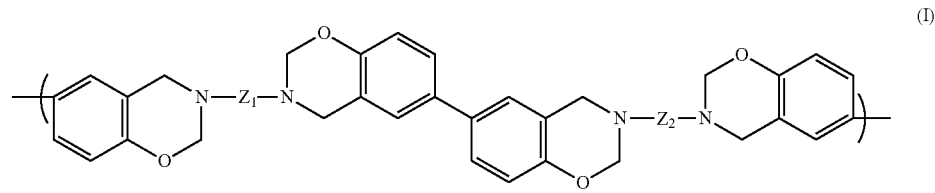

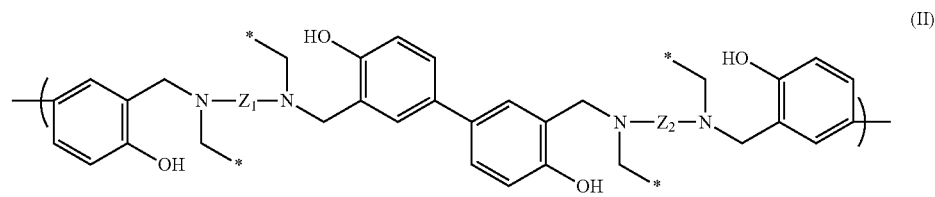

in which $Z_1$ and $Z_2$, which are identical or different, represent an at least divalent, aliphatic, cycloaliphatic or aromatic bonding group comprising at least one carbon atom and optionally at least one heteroatom selected from O, S, N and P.

The invention also relates to the use of such a polymer as coating of a substrate at least the surface of which is at least partially metallic, in particular for the adhesive bonding of such a substrate to a rubber.

The invention also relates to any substrate at least the surface of which is at least partially metallic, at least said metallic part being coated with the polymer according to the invention.

BRIEF DESCRIPTION OF THE FIGURES

The invention and the advantages thereof will be easily understood in the light of the detailed description and exemplary embodiments which follow, and also of the FIGS. 1 to 22 relating to these examples, which represent or depict:
- the general principle for synthesis of a benzoxazine compound from three compounds, phenol, formaldehyde and amine (R=residue of the amine) (FIG. 1a);
- the (ring-opening) mechanism for opening, by heat input, the oxazine ring of such a benzoxazine compound (FIG. 1b);
- a general scheme for the synthesis, starting from a halogenated phenol (the symbol Hal representing a halogen), paraformaldehyde and a diamine, of a halogenated benzoxazine of formula (A) (Monomer denoted by M) that can be used for the synthesis of a polybenzoxazine in accordance with the invention (FIG. 2);
- a possible scheme for the synthesis, starting from a halogenated phenol, p-formaldehyde and a specific diamine, of aliphatic type, of a particular halogenated benzoxazine of formula (A-1) (Monomer denoted by M-1) that can be used for the synthesis of a polybenzoxazine in accordance with the invention (FIG. 3);
- another possible scheme for the synthesis, starting from a halogenated phenol, p-formaldehyde and another specific diamine, of aromatic type, of another example of a particular halogenated benzoxazine of formula (A-2) (Monomer denoted by M-2) that can be used for the synthesis of another polybenzoxazine in accordance with the invention (FIG. 4);
- three other possible schemes for the synthesis, starting from a halogenated phenol, p-formaldehyde and specific diamines that are all aliphatic, of other examples of particular halogenated benzoxazines of respective formulae (A-3), (A-4) and (A-5) (Monomers denoted by M-3, M-4 and M-5) that can be used for the synthesis of other polybenzoxazines in accordance with the invention (FIG. 5, FIG. 6 and FIG. 7);
- another possible scheme for the synthesis, starting from a halogenated phenol, p-formaldehyde and a specific aliphatic triamine, of another example of a particular halogenated benzoxazine of formula (A-6) (Monomer denoted by M-6) that can be used for the synthesis of another polybenzoxazine in accordance with the invention (FIG. 8);
- a general scheme for the synthesis of a polybenzoxazine polymer (Polymer denoted by P) according to the invention, starting from the halogenated benzoxazine of formula (A) (Monomer M) from FIG. 2 and another halogenated benzoxazine (Monomer M') of generic formula (A') (FIG. 9);
- a scheme for the synthesis of a particular polybenzoxazine polymer (Polymer denoted by P-1) according to the invention, starting from a particular halogenated benzoxazine of formula (A-7) (Monomer M-7) and another particular halogenated benzoxazine (Monomer M-7') of formula (A-7') (FIG. 10);
- a scheme for the synthesis of another polybenzoxazine (Polymer denoted by P-2) according to the invention, starting from the particular halogenated benzoxazine of formula (A-7) (Monomer M-7) from the preceding FIG. 10 and another particular halogenated benzoxazine of formula (A-8) (Monomer M-8) (FIG. 11);
- a scheme for the synthesis of another polybenzoxazine (Polymer denoted by P-3) according to the invention, starting from the halogenated benzoxazine of formula (A-7) (Monomer M-7) and another particular halogenated benzoxazine of formula (A-9) (Monomer M-9) (FIG. 12);
- the polybenzoxazine (Polymer denoted here by P') according to the invention from FIG. 9 once the oxazine rings thereof have been opened after heat treatment of the Polymer P (FIG. 13);
- the particular polybenzoxazine (Polymer denoted by P-1') according to the invention of FIG. 10, once the oxazine rings thereof have been opened after heat treatment of the Polymer P-1 (FIG. 14);
- the scheme for the synthesis, starting from brominated phenol (compound 1), p-formaldehyde (compound 3) and a specific aliphatic diamine (compound 2), of a particular brominated dibenzoxazine of formula (A-10) (Monomer denoted by M-10) that can be used for the synthesis of polybenzoxazines (Polymer P-4 and P-4' from FIG. 17) in accordance with the invention (FIG. 15);
- the $^1$H NMR spectrum (500 MHz) of Monomer M-10 dissolved in $CD_2Cl_2$ (FIG. 16);
- the scheme for the synthesis of a particular polybenzoxazine (homopolymer) (Polymer denoted by P-4) according to the invention, starting from the sole particular halogenated benzoxazine of formula (A-10) (Monomer M-10) from the preceding FIG. 15, and also the structure of this polymer once the oxazine rings thereof have been opened (Polymer denoted by P-4') (FIG. 17);
- the scheme for the synthesis of a particular polybenzoxazine (homopolymer) (Polymer denoted by P-5) according to the invention, starting from the sole particular halogenated benzoxazine of formula (A-11) (Monomer M-11), and also the structure of this polymer once the oxazine rings thereof have been opened (Polymer denoted by P-5') (FIG. 18);
- the scheme for the synthesis, starting from brominated phenol (compound 1), p-formaldehyde (compound 3) and another specific aliphatic diamine (compound 4), of a particular brominated dibenzoxazine of formula (A-12) (Monomer denoted by M-12) that can be used for the synthesis of polybenzoxazines (Polymer P-6 and P-6' from FIG. 20) in accordance with the invention (FIG. 19);
- the scheme for the synthesis of a particular polybenzoxazine (homopolymer) (Polymer denoted by P-6) according to the invention, starting from the sole particular halogenated benzoxazine of formula (A-12) (Monomer M-12), and also the structure of this polymer once the oxazine rings thereof have been opened (Polymer denoted by P-6') (FIG. 20);

another possible scheme for obtaining the preceding Polymer P-6, by direct synthesis (starting from the compounds 3, 4 and 5), i.e. without passing through the preceding Monomer M-12 (FIG. 21);

Figure 22:
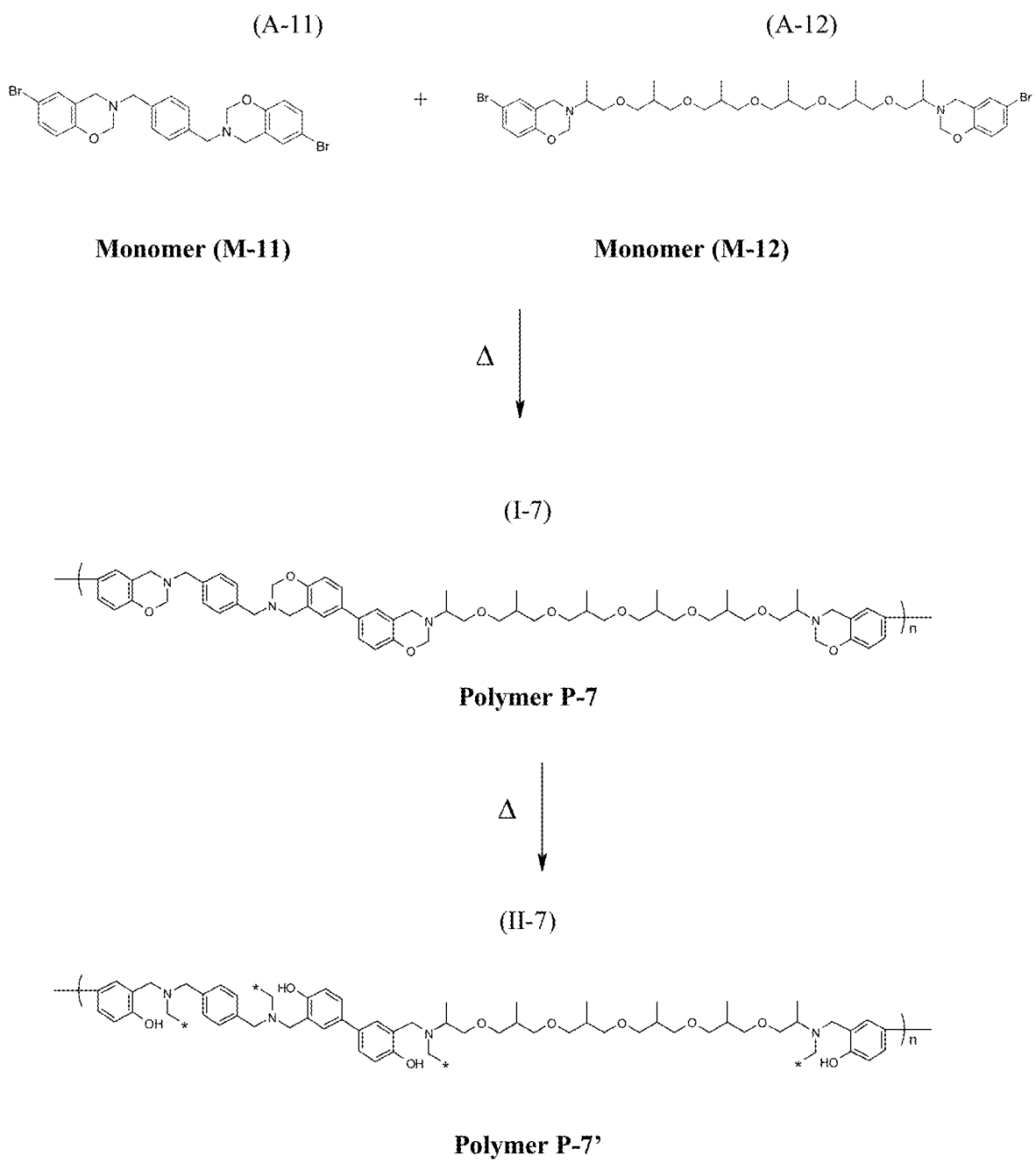

the scheme for the synthesis of a particular polybenzoxazine (Polymer denoted by P-7) according to the invention, starting from the preceding particular halogenated benzoxazine of formula (A-11) (Monomer M-11) and from the preceding particular monomer of formula (A-12) (Monomer M-12), and also the structure of this polymer once the oxazine rings thereof have been opened (Polymer denoted by P-7') (FIG. 22).

4. DETAILED DESCRIPTION OF THE INVENTION

Unless expressly indicated otherwise, all the percentages (%) indicated in the present application are percentages by mass (or by weight, in an equivalent manner).

The expression "x and/or y" means "x" or "y" or both (i.e. "x and y"). Any range of values denoted by the expression "between a and b" represents the field of values ranging from more than "a" to less than "b" (that is to say limits "a" and "b" excluded), whereas any range of values denoted by the expression "from a to b" means the field of values ranging from "a" up to "b" (that is to say including the strict limits "a" and "b").

It will firstly be recalled that benzoxazines are compounds of general formula:

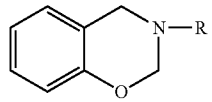

The appended FIG. 1a recalls the general principle for the synthesis of a benzoxazine, here starting from (condensation reaction) one molecule of phenol, two molecules of formaldehyde and an amine (R denoting the residue of the amine), with elimination of two molecules of water.

FIG. 1b itself recalls the (ring-opening) mechanism for opening the oxazine ring of such a compound during a heat input (represented by the symbol A).

Numerous benzoxazine compounds or monomers can thus be synthesized using various phenols and amines depending on their types of substituents. These groups of substituents may then provide polymerizable sites and enable the synthesis of various benzoxazine polymers (or polybenzoxazines).

Benzoxazines and polybenzoxazines which are derived therefrom are products that are nowadays well known to a person skilled in the art; to cite but a few publication examples, mention may be made of the articles "*Polybenzoxazines—New high performance thermosetting resins: synthesis and properties*"; N. N. Ghosh et al., Prog. Polym. Sci. 32 (2007), 1344-1391, or "*Recent Advancement on Polybenzoxazine—A newly Developed High Performance Thermoset*", Y. Yaggi et al., J. Polym. Sci. Part A: Polym. Chem., Vol. 47 (2009), 5565-5576, and also for example the patents or patent applications U.S. Pat. No. 5,543,516, WO 2013/148408.

As explained in detail in the above documents, polybenzoxazines have the remarkable ability, at high temperature (for example typically above 150° C. or even above 200° C. depending on their particular microstructure) to open their oxazine rings and to thus result in thermosetting polyphenolic resin structures.

The specific polybenzoxazine of the invention derives from a benzoxazine (referred to as Monomer M in the present application) of halogenated type that corresponds to the following generic formula (A), Hal representing a (at least one, i.e. one or more) halogen:

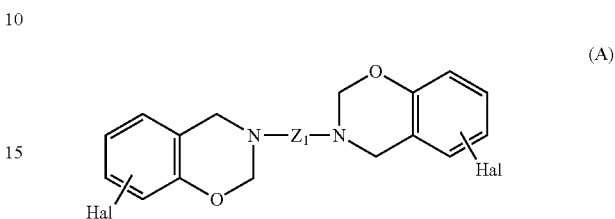

Figure 2:
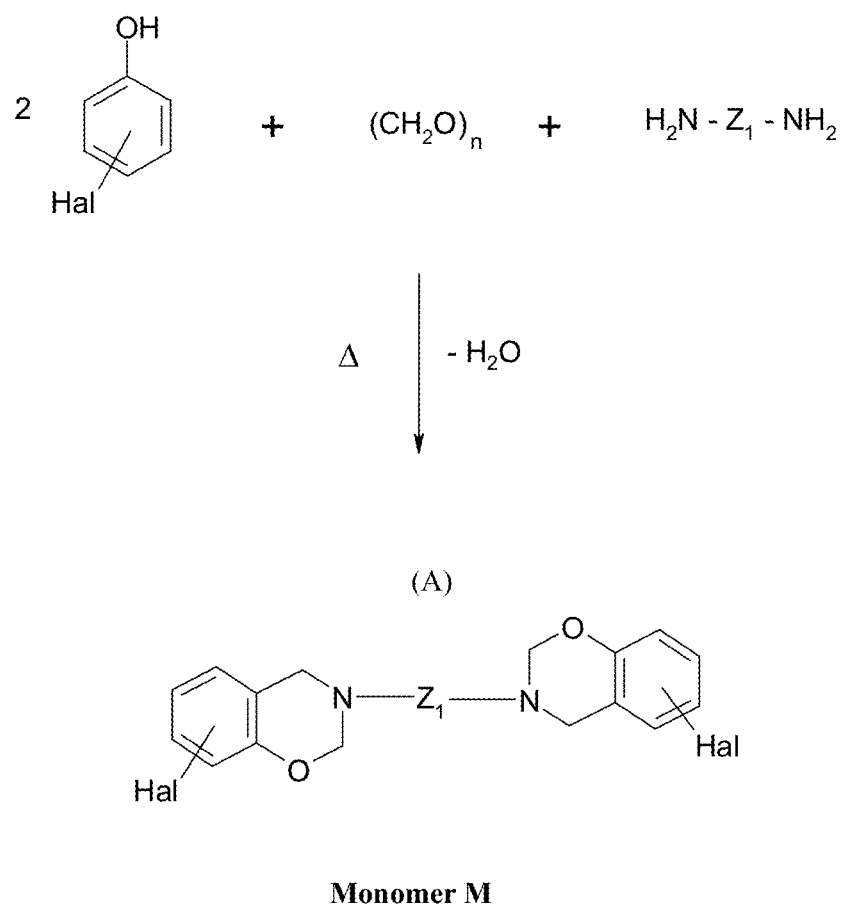

FIG. 2 gives the general scheme for the synthesis thereof, under heat input (A) and with elimination of water, starting from a halogenated phenol, p-formaldehyde and a diamine.

In the formula (A) above, Z (like $Z_1$ and $Z_2$ described below) represents a bonding group (spacer) that is at least divalent, that is to say that it could comprise more than two covalent bonds, for example three or four covalent bonds. Preferably, Z (like $Z_1$ and $Z_2$ described below) is divalent, that is to say comprises only two covalent bonds.

Z (like $Z_1$ and $Z_2$ described below) may be aliphatic, cycloaliphatic or aromatic. This group, which may be ethylenically saturated or unsaturated, by definition comprises at least one (i.e. one or more) carbon atom, and optionally at least one (i.e. one or more) heteroatom chosen from O (oxygen), S (sulfur), N (nitrogen) and P (phosphorus).

According to one preferential embodiment of the invention, Z (like $Z_1$ and/or $Z_2$ described below) represents an aliphatic group comprising from 1 to 20, more preferentially from 1 to 16, in particular from 1 to 12 carbon atoms, or else a cycloaliphatic group comprising from 3 to 20, more preferentially from 3 to 16, in particular from 3 to 12 carbon atoms. More preferentially still, Z (like $Z_1$ and/or $Z_2$ described below) represents an alkylene group comprising from 1 to 20, preferably from 1 to 16, in particular from 1 to 12 carbon atoms.

More preferentially, Z (like $Z_1$ and/or $Z_2$ described below) comprises at least one group selected from $—(CH_2)_x—$, $—CH_2\text{-}Ph\text{-}CH_2—$, $—(CH_2—CH_2—X)_n—$ and $—(CH(CH_3)—CH_2—X)_n—$, "x" and "n" being integers from 1 to 20, in particular from 1 to 16, more particularly from 1 to 12, Ph representing the benzene ring, and X representing at least one (i.e. one or more) heteroatom chosen from O (oxygen), S (sulfur), N (nitrogen) and P (phosphorus).

Each benzene ring of the Monomer M bears at least one (i.e. one or more) halogen. Moreover, in this monomer of formula (A), one or more hydrogen atoms of at least one or each benzene ring may (optionally) be substituted by various substituents, for example by functional groups capable of promoting the adhesion of the polymer to the metal and/or to the rubber.

Preferably, each benzene ring of the monomer M bears a single halogen (Hal) or at most two, more preferentially one and only one halogen, the latter being more preferentially located in the para position to the oxygen of the oxazine ring.

According to one particularly preferential embodiment, which can be combined with each of the other embodiments of the invention, Hal represents bromine.

Figure 3:
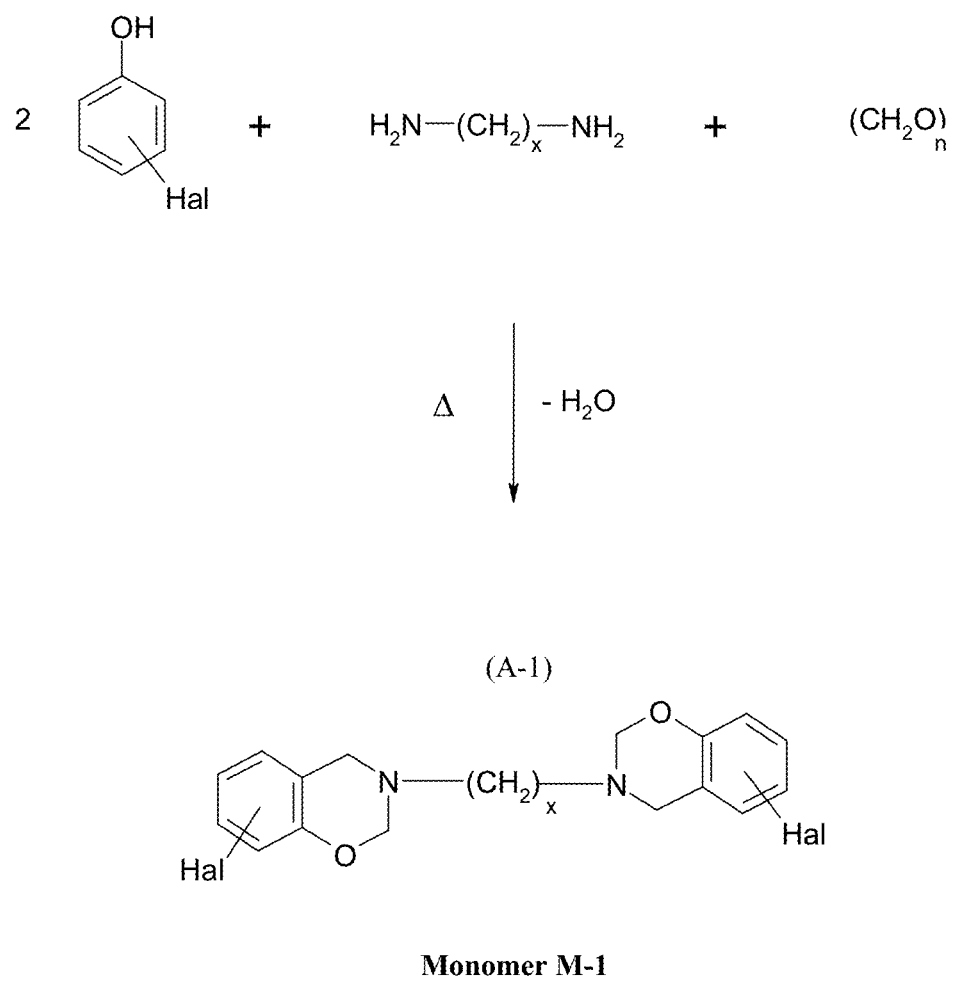
Figure 15:
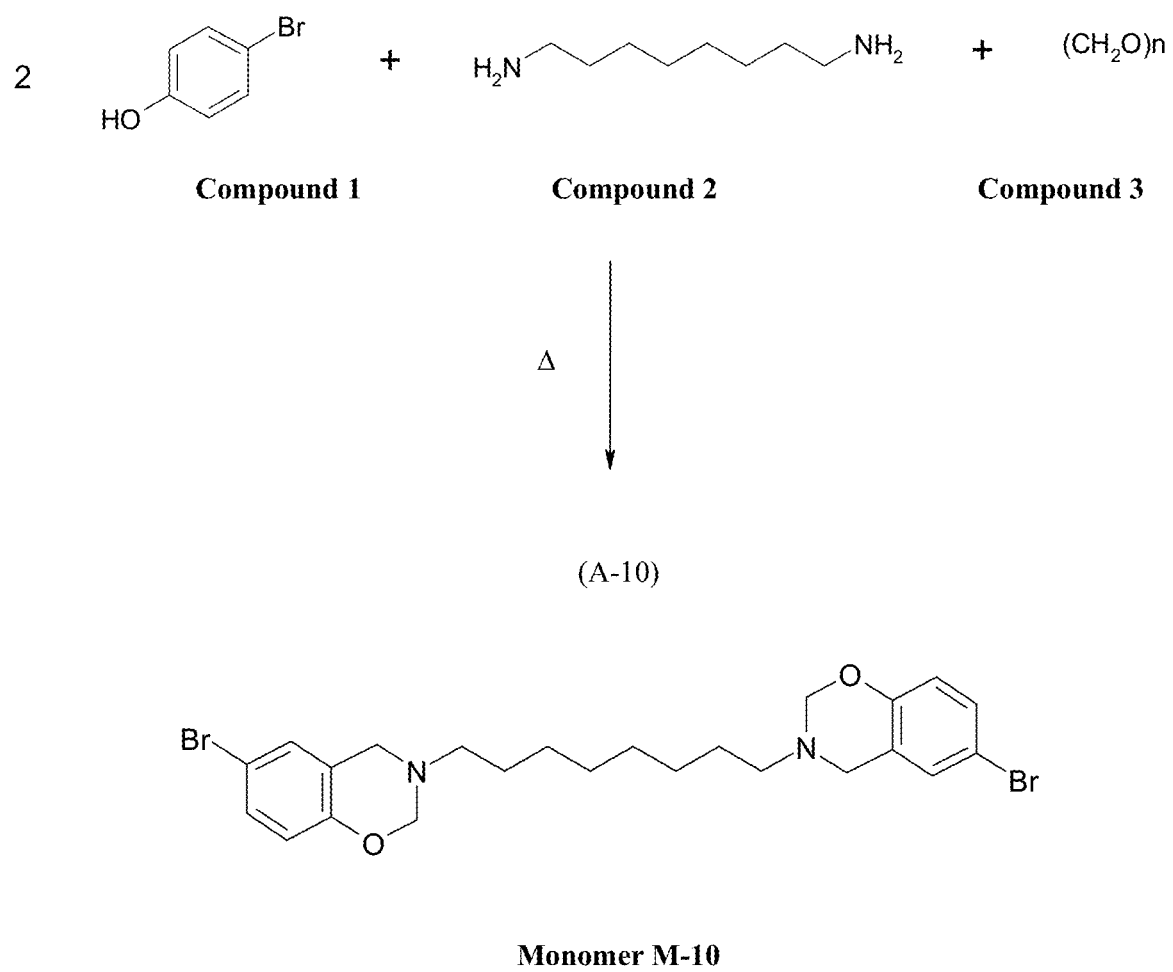
Figure 16:
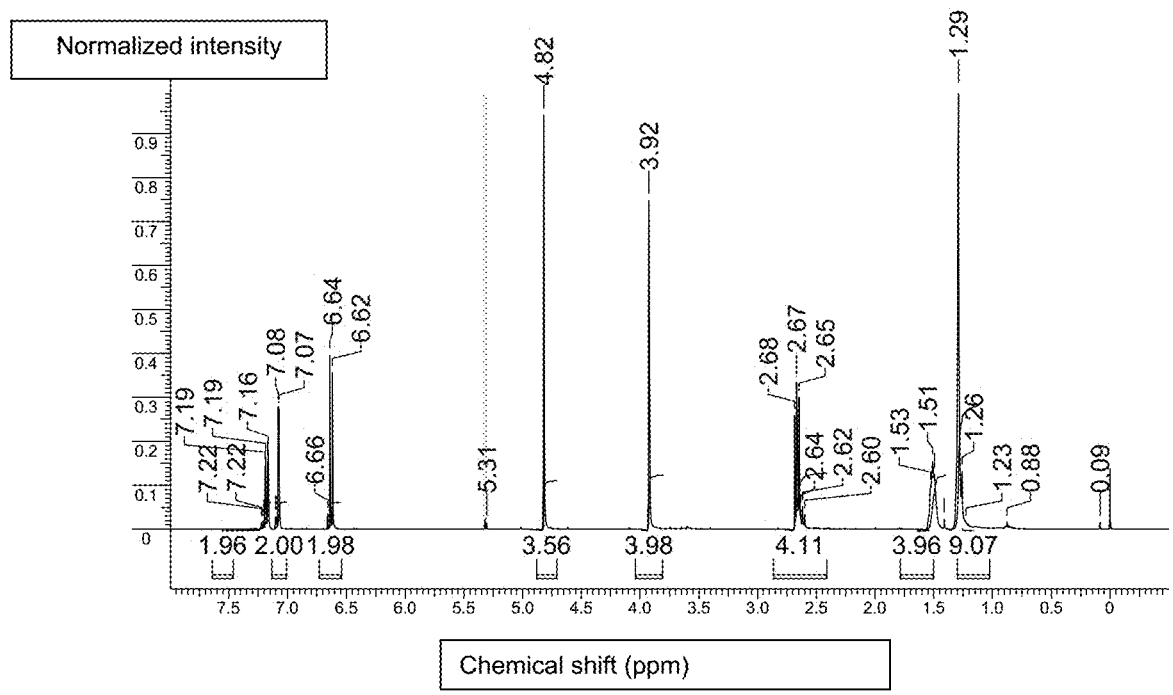

FIG. 3 illustrates a possible scheme for the synthesis, starting from a specific diamine of aliphatic type (polyethylene diamine), of a particular halogenated benzoxazine of formula (A-1), this benzoxazine being able to be used as monomer (Monomer denoted by M-1) for the subsequent synthesis of a polybenzoxazine in accordance with the invention. It is noted that Z represents here a —(CH$_2$)$_x$— methylene group in which the symbol "x" represents an integer that preferably varies from 1 to 20, more preferentially from 1 to 16, in particular from 1 to 12. Such a synthesis will be exemplified later for the obtaining of a specific monomer (Monomer M-10; FIG. 15 and FIG. 16).

Figure 8:
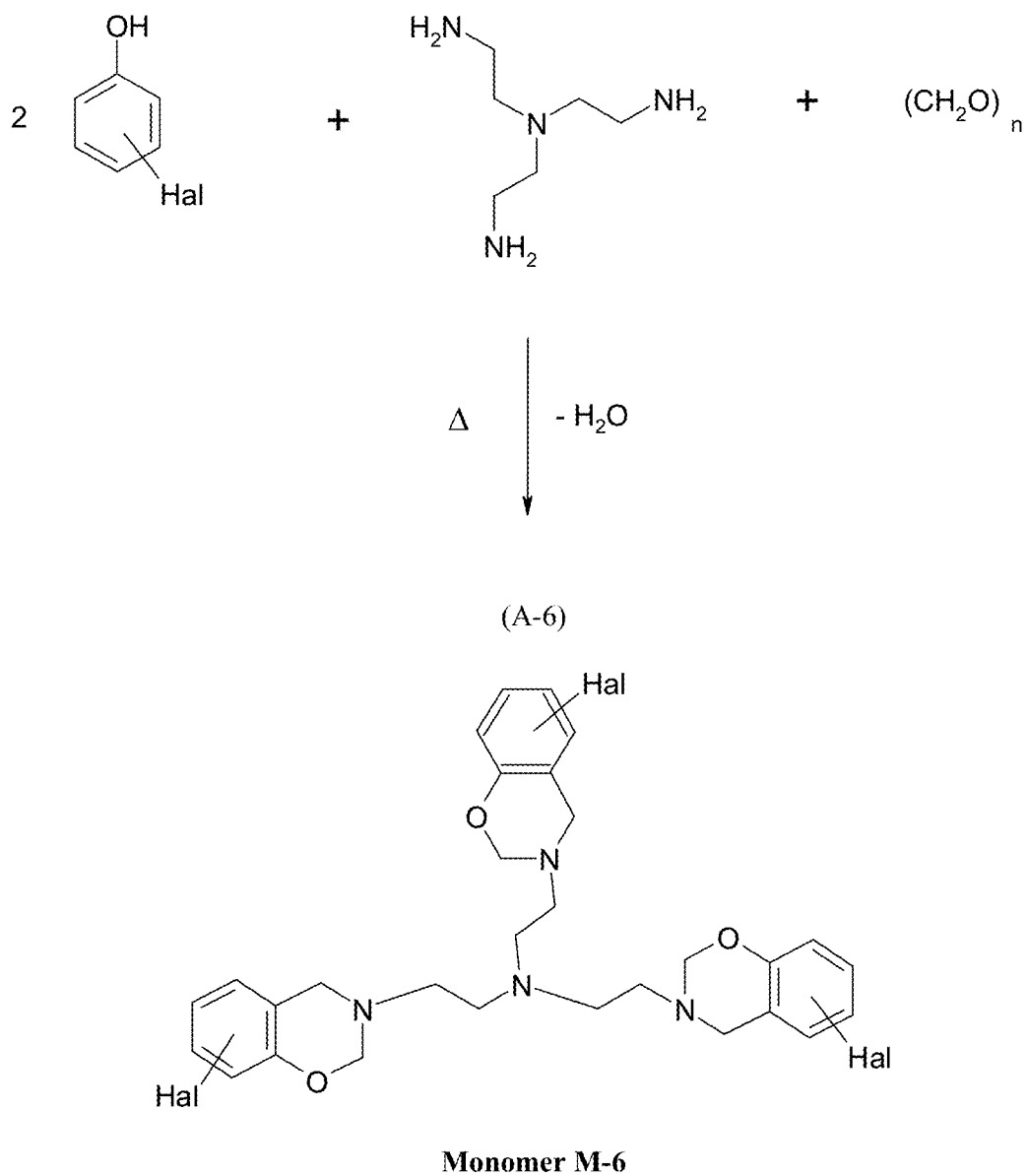

FIG. 8 illustrates another possible scheme for the synthesis, starting from a halogenated phenol, paraformaldehyde and a specific aliphatic polyamine consisting this time of a triamine (tris(3-aminopropyl)amine), of another example of a particular halogenated (tri)benzoxazine compound of formula (A-6) that can be used as a monomer (Monomer denoted by M-6) for the synthesis of another polybenzoxazine according to the invention.

The polybenzoxazine of the invention (Polymer P) therefore has the essential feature of comprising structural repeating units comprising at least one unit corresponding to the formula (I) (before opening of the oxazine rings) or formula (II) (after ring opening) below:

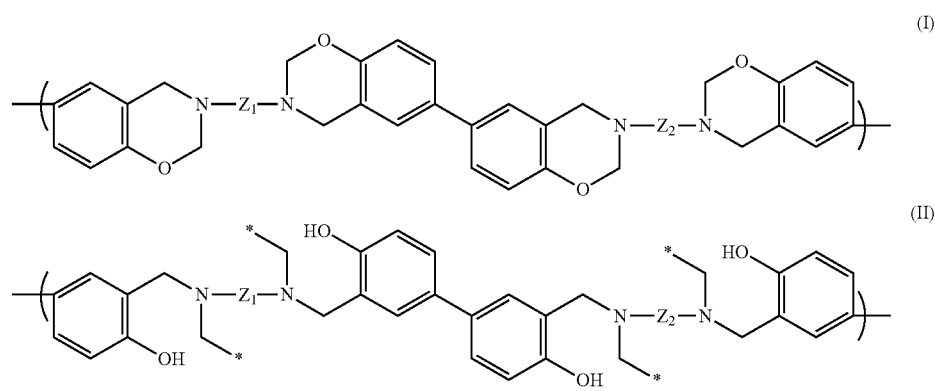

Figure 4:
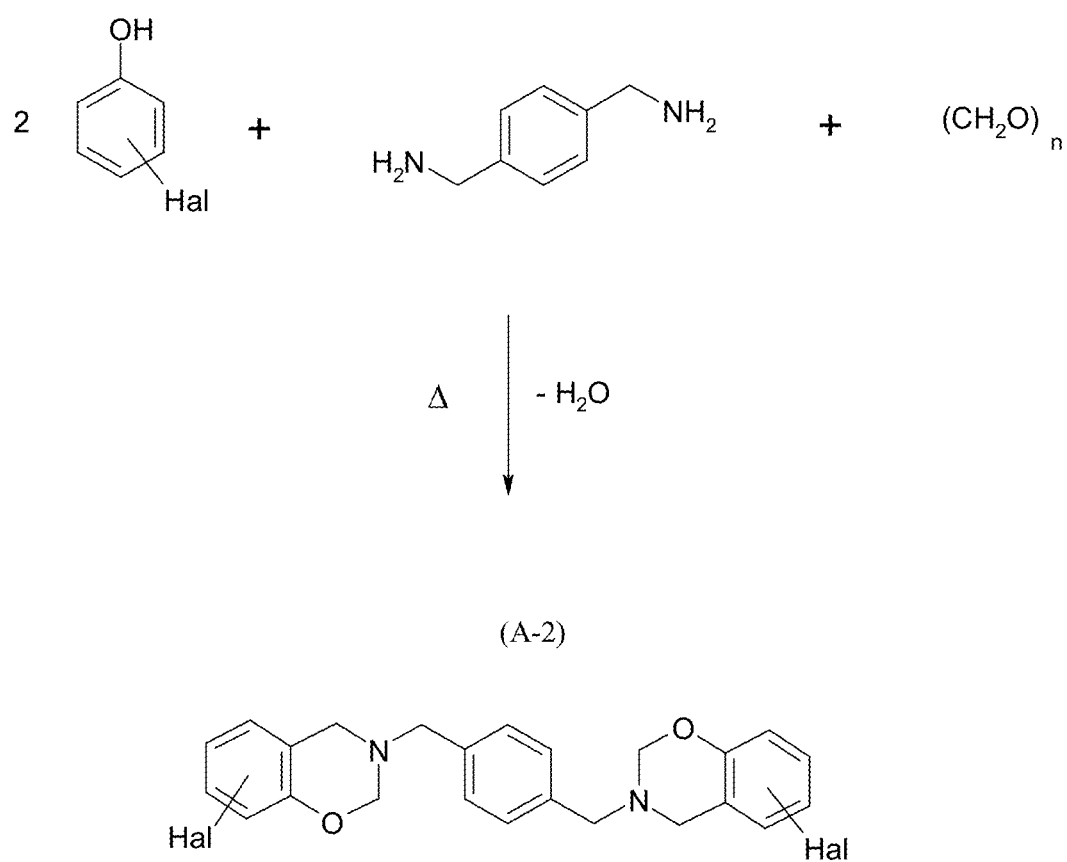

According to another preferred embodiment, Z (like Z$_1$ and/or Z$_2$ described below) represents an aromatic group comprising from 6 to 30, more preferably from 6 to 20, carbon atoms. Thus, FIG. 4 illustrates another possible scheme for the synthesis, this time starting from a specific diamine of aromatic type (p-xylylene diamine), of another example of a particular halogenated benzoxazine of formula (A-2), that can be used as monomer (Monomer denoted by M-2) for the subsequent synthesis of another polybenzoxazine in accordance with the invention.

Figure 5:
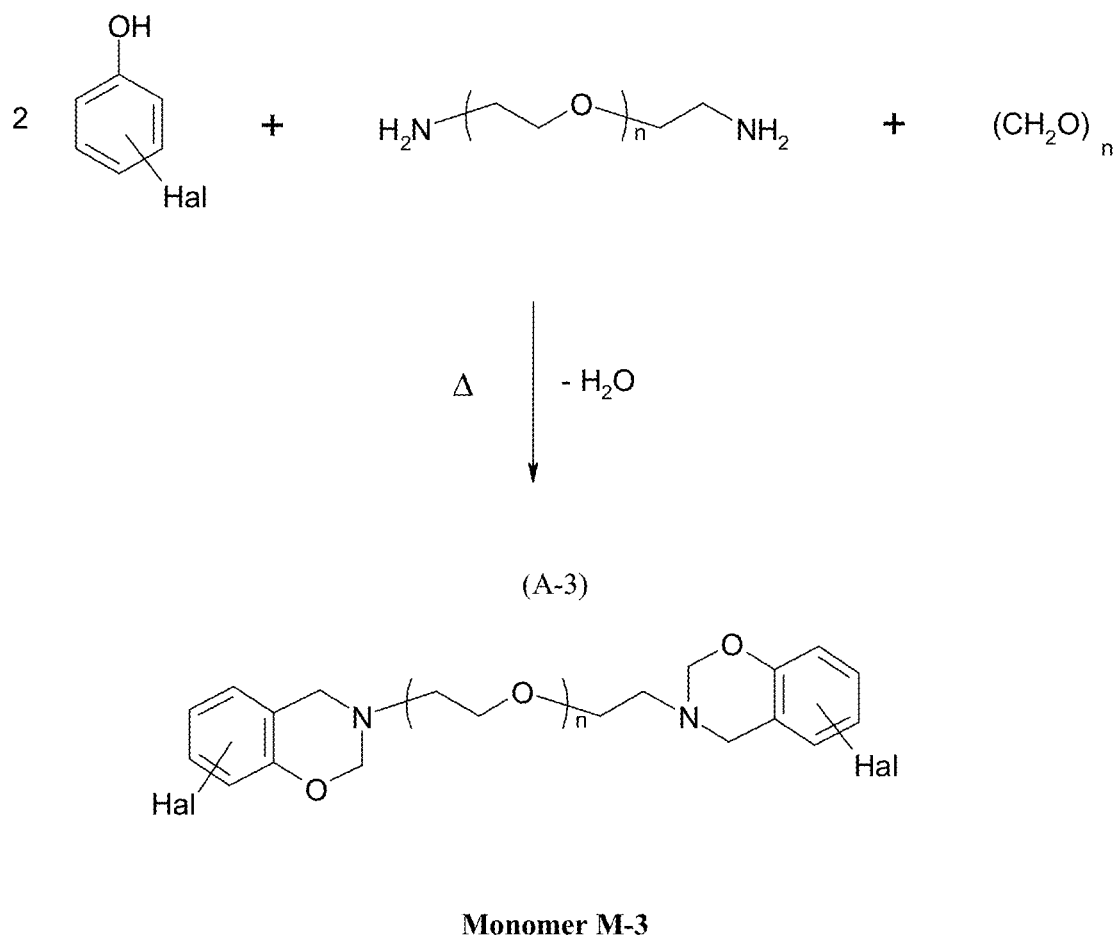
Figure 6:
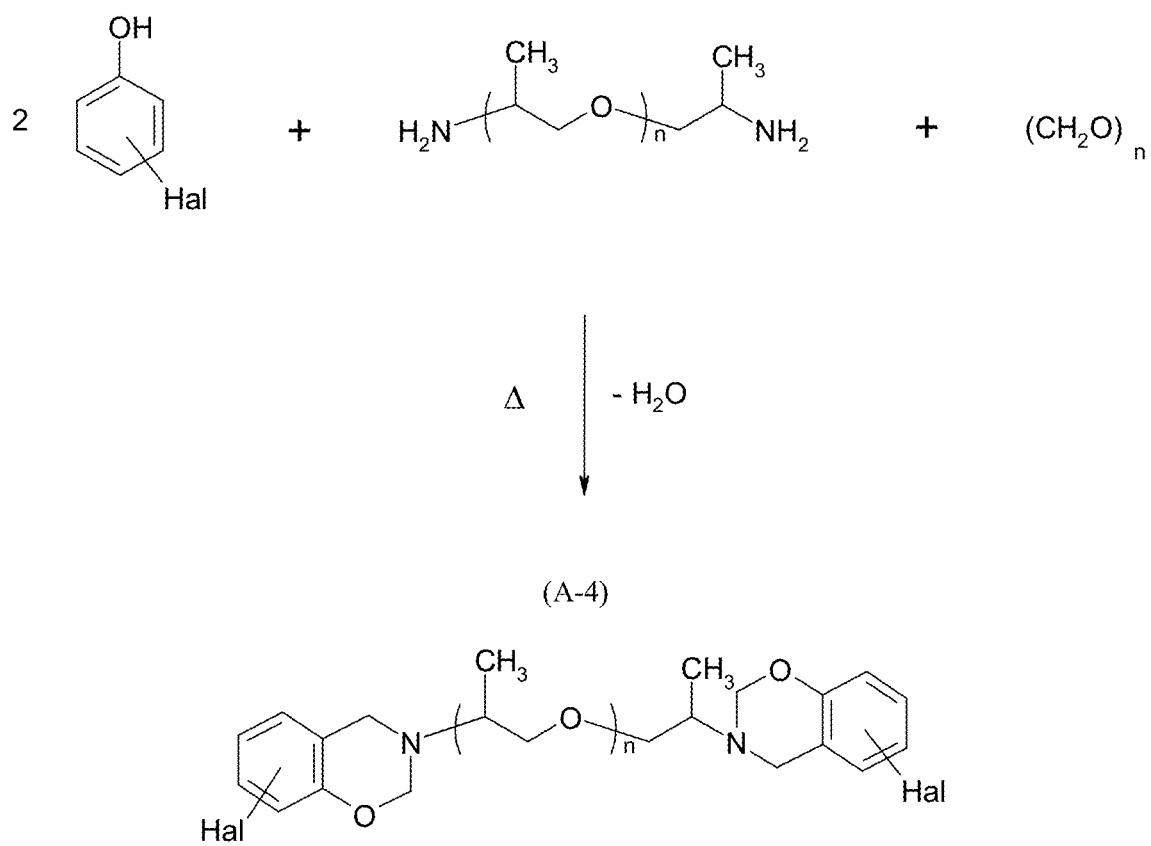
Figure 7:
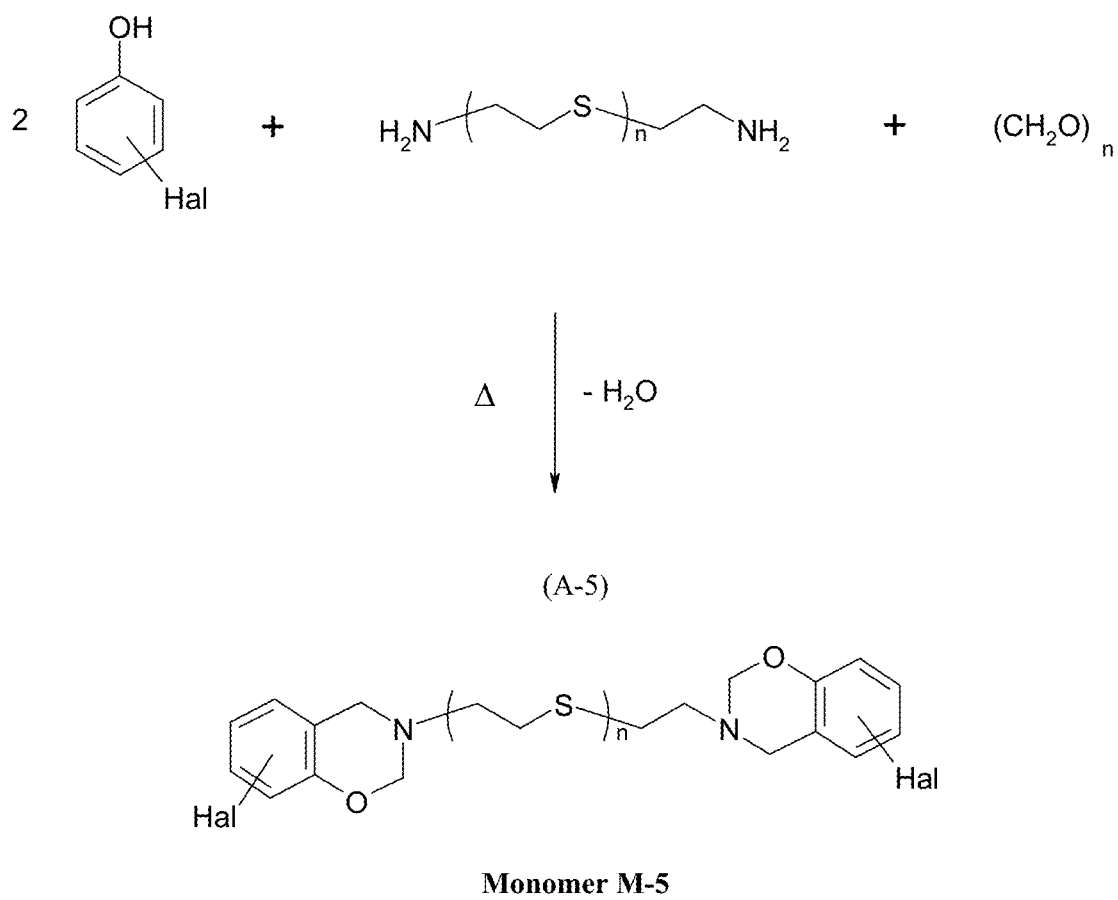

FIGS. 5, 6 and 7 illustrate three other possible schemes for the synthesis, always starting from a halogenated phenol and paraformaldehyde on the one hand and, on the other hand, from various specific diamines, all of aliphatic type, of other examples of particular benzoxazines of respective formulae (A-3), (A-4) and (A-5) that can be used as monomers (Monomers respectively denoted by M-3, M-4 and M-5) for the synthesis of polybenzoxazines in accordance with the invention.

In FIG. 5, the repetition of the (polyethylene oxide) [—CH$_2$—CH$_2$—O—] units on the bonding group Z is capable of resulting in polybenzoxazines of high crystallinity, whilst in FIG. 6, the presence of the (polypropylene oxide) methyl groups on Z makes it possible to reduce the reactivity of the two amine end groups and to result in polybenzoxazines of lower crystallinity. In FIG. 7, the presence on the spacer Z of the sulfur atom (heteroatom) in the (polyethylene thioether) [—CH$_2$—CH$_2$—S—] repeat units, is capable of further improving the adhesion of the polybenzoxazine to metal. Thus, it can be seen that the structure of the Z (like Z$_1$ and Z$_2$ described below) group of the benzoxazine monomer may be modified considerably with the aim of adjusting the properties of the final polymer. This constitutes a major advantage of the present invention.

in which Z$_1$ and Z$_2$, which are identical or different, represent a bonding group (spacer) that is at least divalent and aliphatic, cycloaliphatic or aromatic, comprising at least one carbon atom and optionally at least one heteroatom chosen from O, S, N and P.

A polymer should be understood here as any homopolymer or copolymer, in particular block copolymer, with repeating structural units comprising at least one unit of formula (I) or (II) above; the polymer of the invention may of course comprise both units of formula (I) and units of formula (II).

In formula (II) above, a person skilled in the art will immediately understand that the symbols "*" (which are identical or different) represent any attachment of the unit to a carbon atom or to a heteroatom (preferably chosen from O, S, N and P), which attachment or bond results from the opening of the oxazine rings.

It will of course be understood that Z$_1$ and Z$_2$ have the main definitions and the preferential definitions already described in detail above for Z in the benzoxazine (monomer) compound.

Thus, according to one preferential embodiment, Z$_1$ and/or Z$_2$, which are identical or different, represent an aliphatic group comprising from 1 to 20, preferably from 1 to 16 carbon atoms, or a cycloaliphatic group comprising from 3 to 20, preferably from 3 to 16 carbon atoms, and optionally at least one heteroatom chosen from O, S, N and P.

More preferentially, Z$_1$ and/or Z$_2$, which are identical or different, represent an alkylene group comprising from 1 to 20, preferably from 1 to 16, in particular from 1 to 12 carbon atoms, and optionally at least one heteroatom chosen from O, S, N and P.

According to another preferential embodiment, Z$_1$ and/or Z$_2$, which are identical or different, represent an aromatic group comprising from 6 to 30, preferably from 6 to 20 carbon atoms, and optionally at least one heteroatom chosen from O, S, N and P.

According to another preferential embodiment, $Z_1$ and/or $Z_2$ comprise at least one group selected from —$(CH_2)_x$—, —$CH_2$-Ph-$CH_2$—, —$(CH_2$—$CH_2$—$X)_n$— and —$(CH(CH_3)$—$CH_2$—$X)_n$—, "x" and "n" being integers from 1 to 20, in particular from 1 to 16, more particularly from 1 to 12, ("x" being denoted more specifically as "$x_1$" in the case of $Z_1$ and does "$x_2$" in the case of $Z_2$), Ph representing the benzene ring, and X representing at least one (i.e. one or more) heteroatom chosen from O (oxygen), S (sulfur), N (nitrogen) and P (phosphorus).

Figure 9:
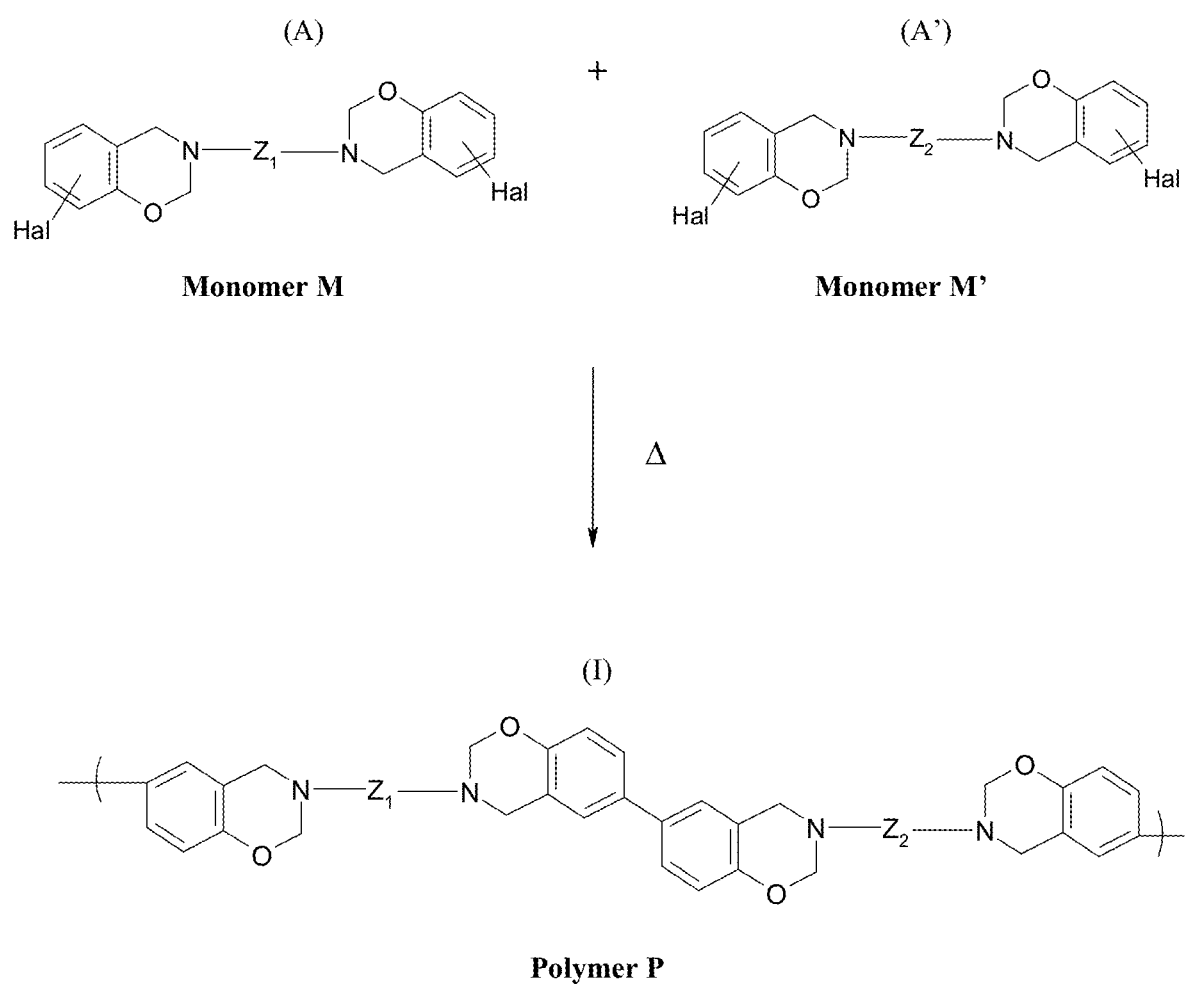

FIG. 9 represents a general scheme for the synthesis, by polycondensation, of a polybenzoxazine (Polymer P) according to the invention, starting from the halogenated benzoxazine of formula (A) from FIG. 2 (Monomer M) and from another monomer (Monomer M'), of generic formula denoted by (A') which is very similar and, which may be distinguished in particular by the nature of its spacer ($Z_2$) and/or of its halogen (Hal).

Figure 13:
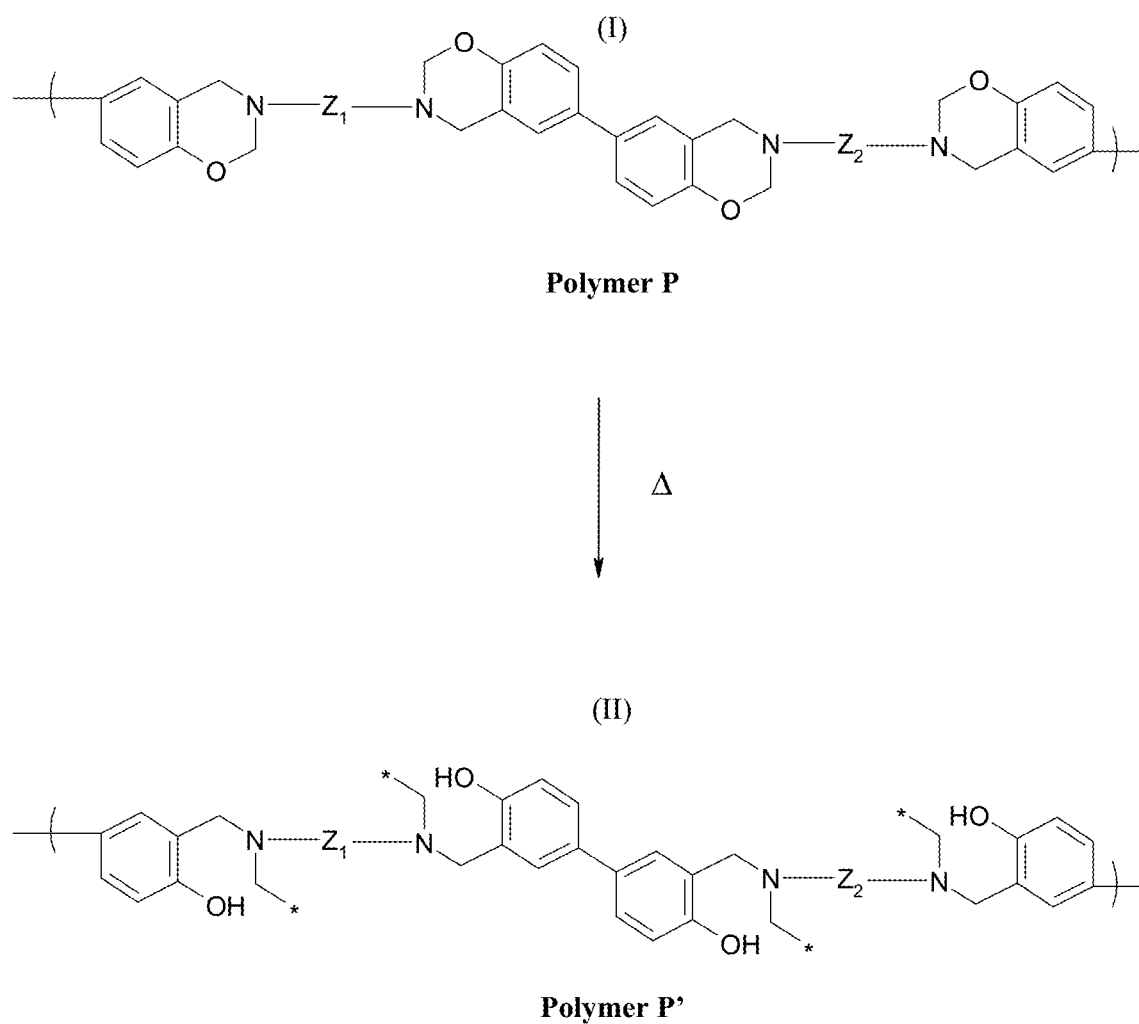

The polybenzoxazine "P" from FIG. 9, more precisely at least some of its repeat units, has also been represented in FIG. 13, before (Polymer P) and after (Polymer P') the opening of its oxazine rings.

Figure 10:
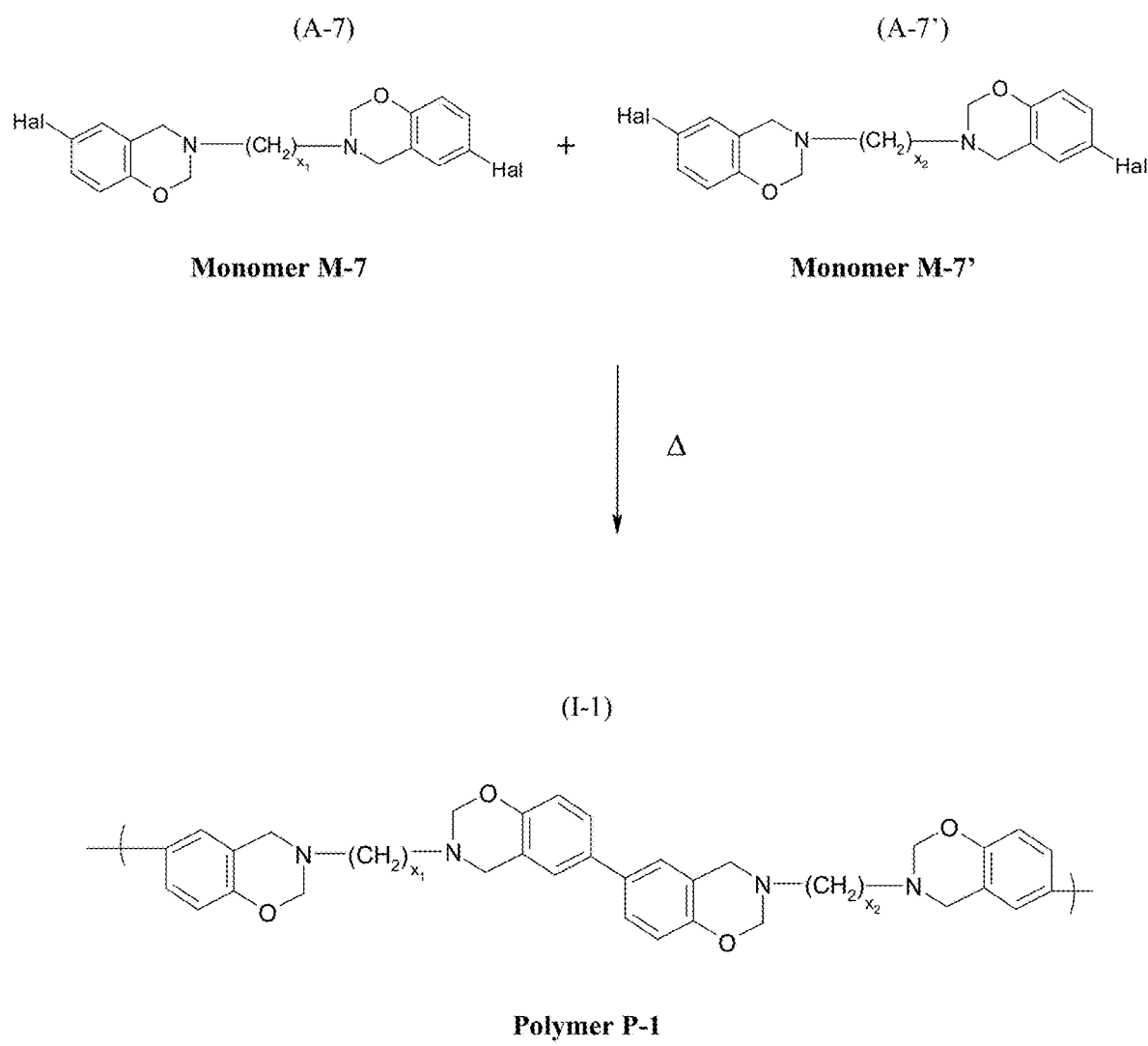

FIG. 10 represents a particular scheme for the synthesis of such a preferential polybenzoxazine according to the invention (Polymer denoted by P-1) of formula (I-1), starting from a particular halogenated benzoxazine (Monomer M-7) of formula (A-7) and from another particular halogenated benzoxazine (Monomer M-7') of formula (A-7') which is very similar and which may be distinguished in particular by the value of the integer "x" (respectively "$x_1$" and "$x_2$" for $Z_1$ and $Z_2$).

In this example, it is noted in particular, according to one preferred embodiment of the invention already described, that each benzene ring of the monomers M-7 and M-7' bears one and only one halogen (Hal), more preferentially bromine, this halogen being more particularly located in the para position to the oxygen of the oxazine ring.

Figure 14:
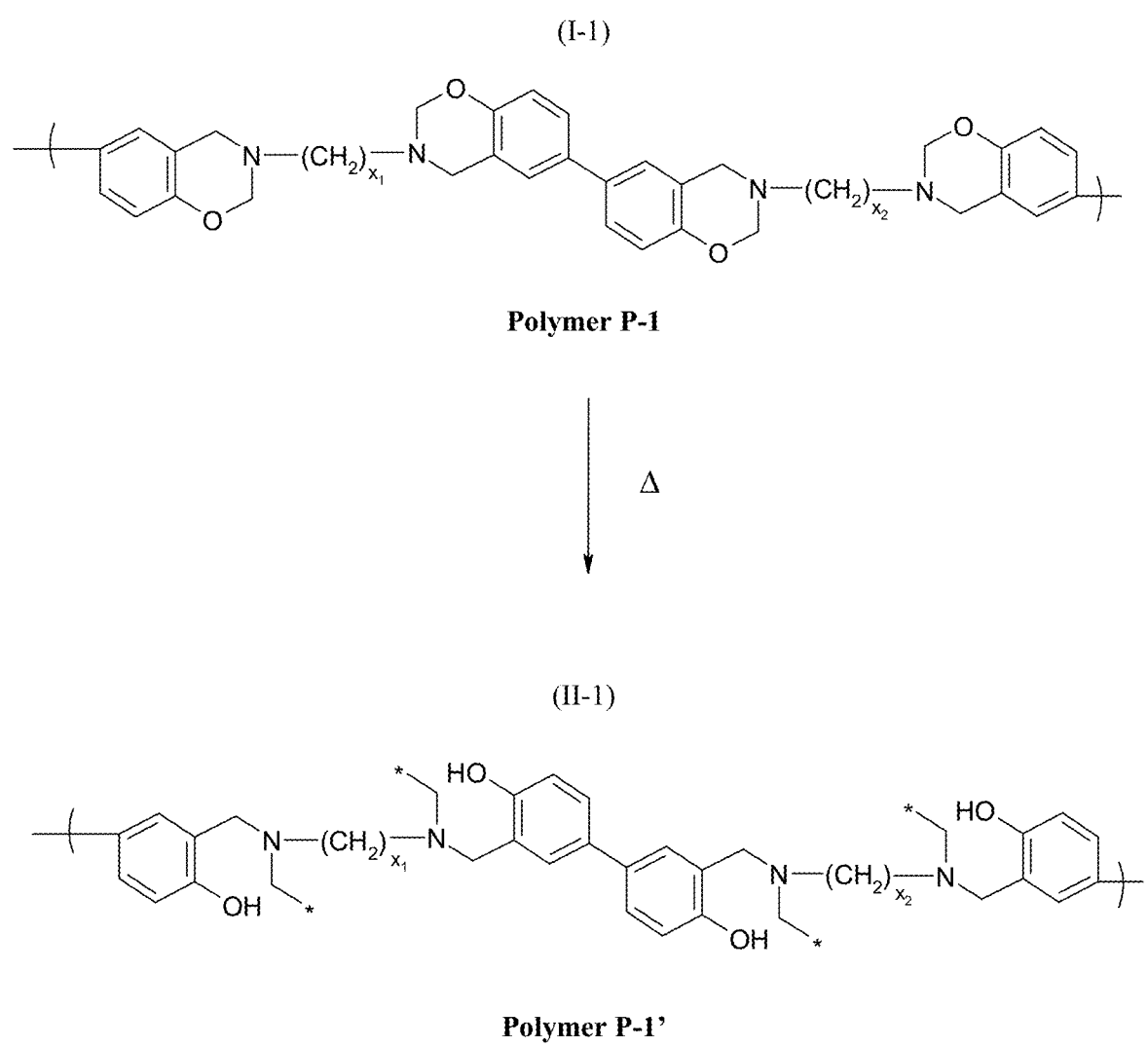

This polybenzoxazine from FIG. 10, or more precisely at least some of its repeat units, has also been represented in FIG. 14, before (Polymer P-1) and after (Polymer P-1') the opening of its oxazine rings following a sufficient heat input.

Figure 11:
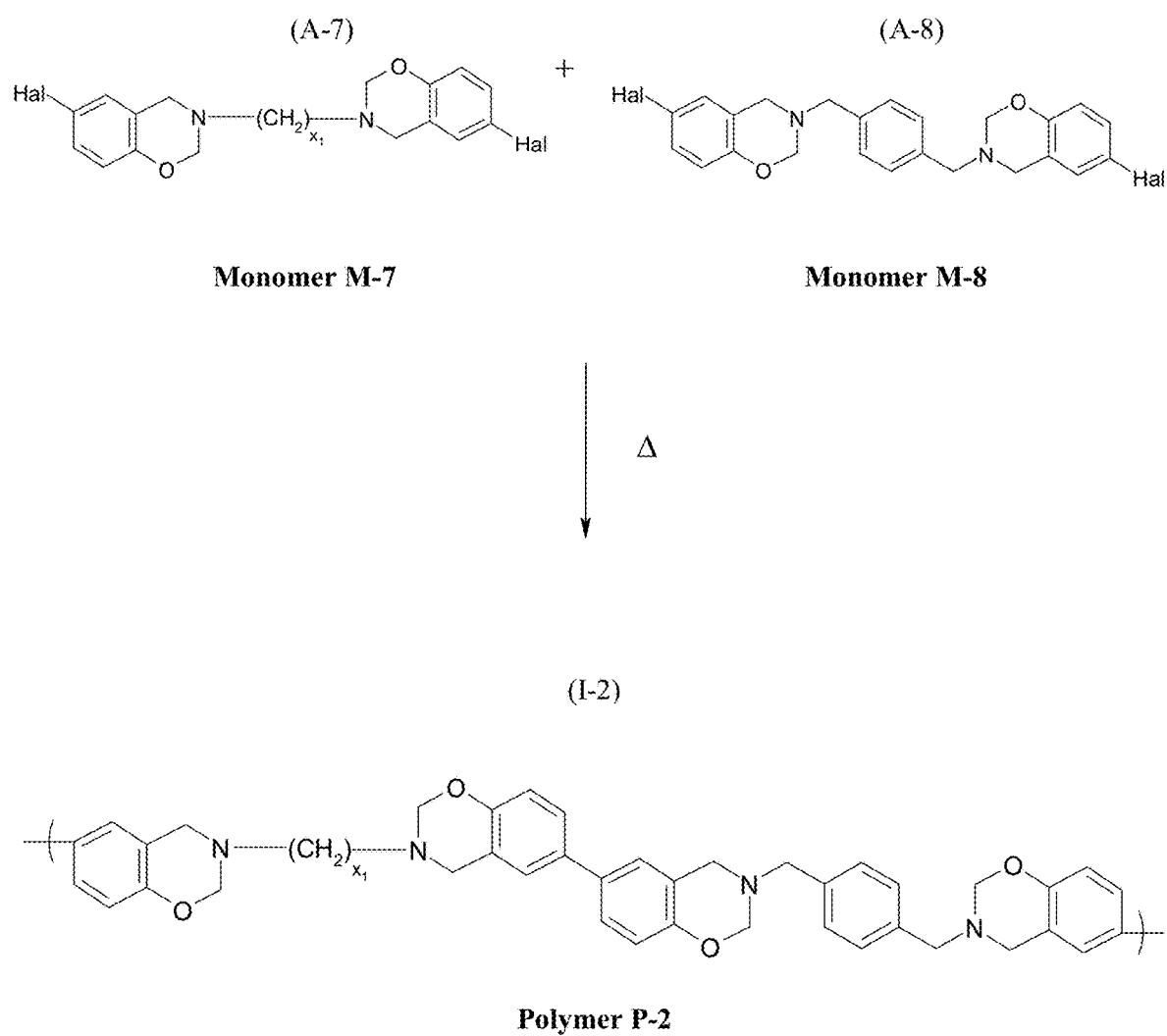

FIG. 11 represents another particular scheme for the synthesis of another specific polybenzoxazine (Polymer denoted by P-2) according to the invention, of formula (I-2), starting from the preceding specific halogenated benzoxazine (Monomer M-7) and from another specific benzoxazine (Monomer M-8) of formula (A-8), of aromatic type with regard to the spacer $Z_2$.

Figure 12:
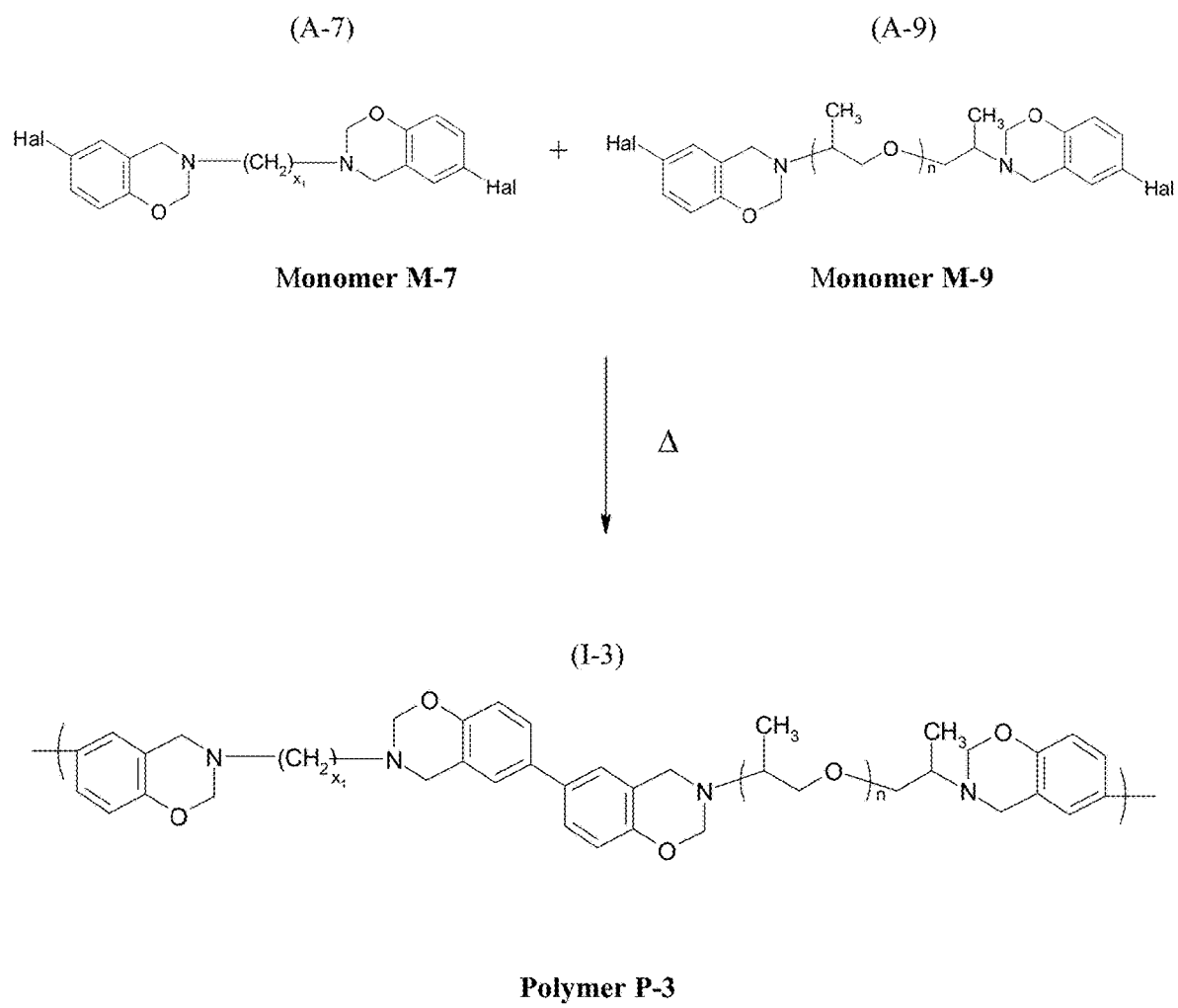

FIG. 12 represents another particular scheme for the synthesis of another specific polybenzoxazine (Polymer denoted by P-3) according to the invention, of formula (I-3), starting from the preceding specific halogenated benzoxazine (Monomer M-7) and from another specific benzoxazine of formula (A-9) (Monomer M-9) of aliphatic type (with heteroatom O) with regard to the spacer $Z_2$.

In these examples from FIGS. 11 and 12, as for the preceding FIG. 10, it is noted in particular, according to one preferred embodiment of the invention already indicated, that each benzene ring of the benzoxazine monomers bears one and only one halogen (Hal), more preferentially bromine, located more particularly in the para position to the oxygen of the oxazine ring.

As already indicated, FIGS. 13 and 14 also represent polybenzoxazines according to the invention (here respectively denoted by P' and P-1') from FIG. 9 and FIG. 10, once their oxazine rings are open after heat input.

FIGS. 15 and 16 represent the scheme for the synthesis, starting from brominated phenol (compound 1), p-formaldehyde (compound 3) and a specific aliphatic diamine (compound 2), of a particular brominated dibenzoxazine of formula (A-10) (Monomer denoted by M-10) that can be used for the synthesis of polybenzoxazines (Polymer P-4 and P-4' from FIG. 17) in accordance with the invention, and also the $^1H$ NMR spectrum (500 MHz) of Monomer M-10 dissolved in $CD_2Cl_2$. These figures will be commented upon in detail later on.

Figure 17:
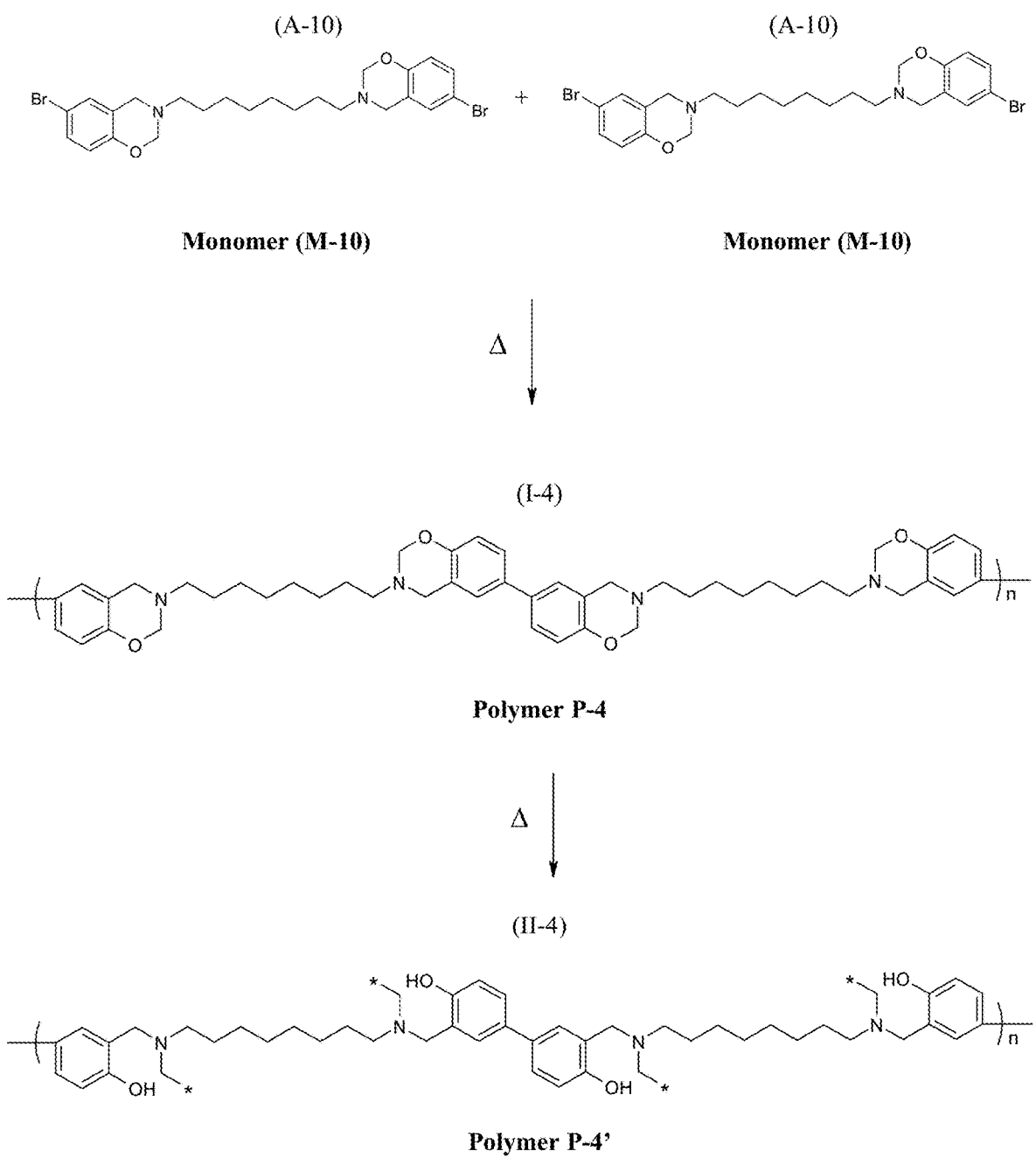
Figure 18:
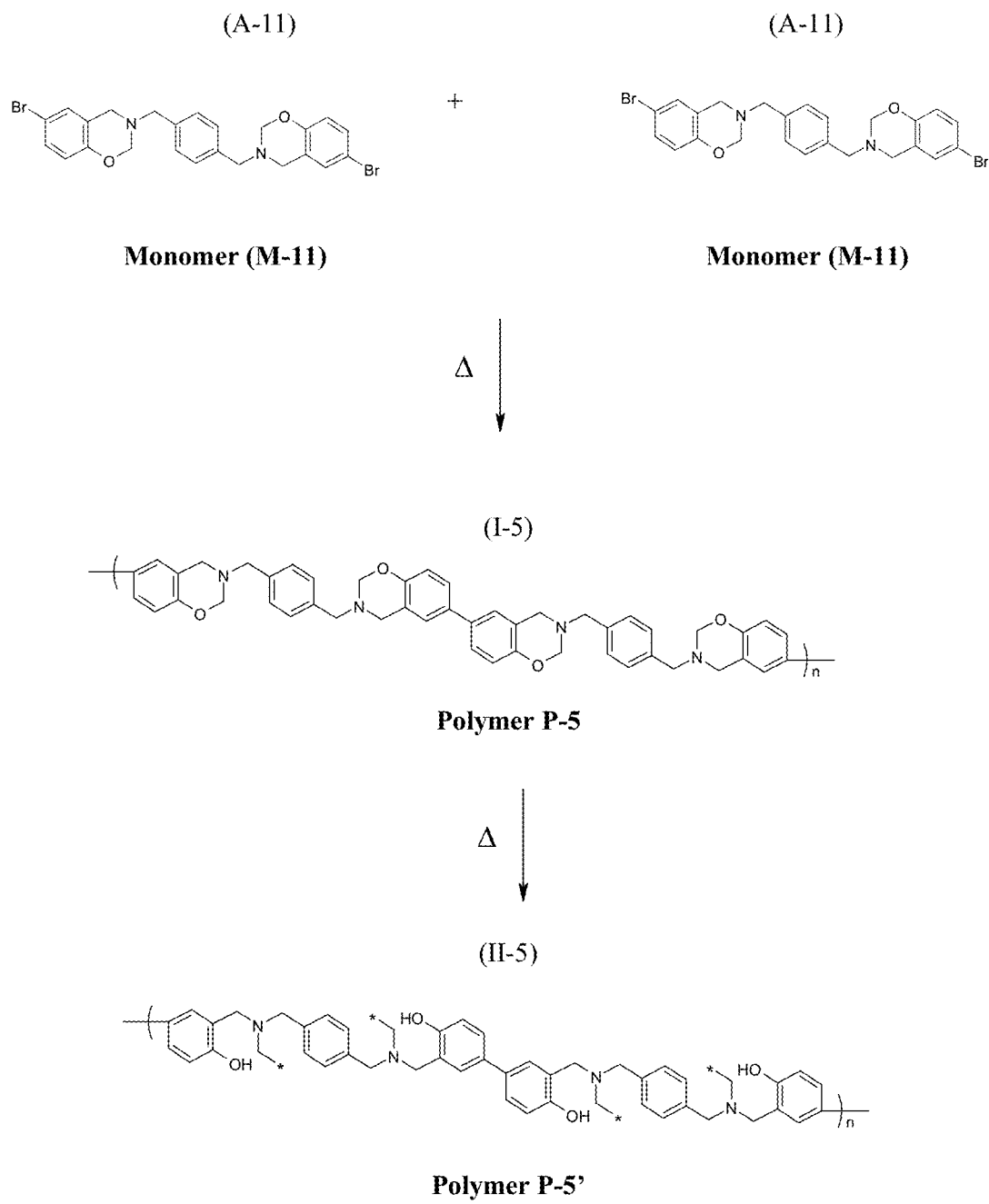

FIGS. 17 and 18 represent two other possible schemes for the synthesis of specific polybenzoxazines according to the invention (Polymers denoted respectively by P-4 and P-5, of respective formulae (I-4) and (I-5), starting from a single brominated benzoxazine (homopolymerization respectively of the Monomers M-10 and M-11 of respective formulae (A-10) and (A-11)), and a heat input (A), and also these same polymers once the oxazine rings thereof have been opened (Polymer P-4' and P-5').

Figure 19:
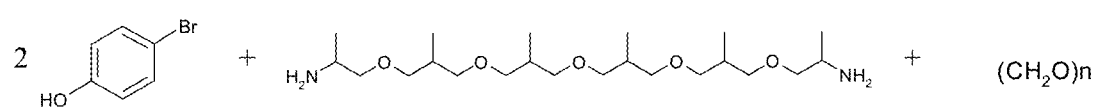
Figure 19:
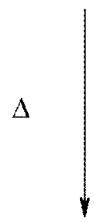
Figure 19:
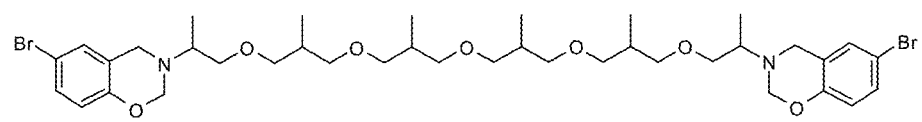

FIG. 19 represents the scheme for the synthesis, starting from brominated phenol (compound 1), p-formaldehyde (compound 3) and another specific aliphatic diamine (compound 4), of a particular brominated dibenzoxazine of formula (A-12) (Monomer denoted by M-12) that can be used for the synthesis of polybenzoxazines (Polymer P-6 and P-6' from FIG. 20 which follows) in accordance with the invention.

Figure 20:
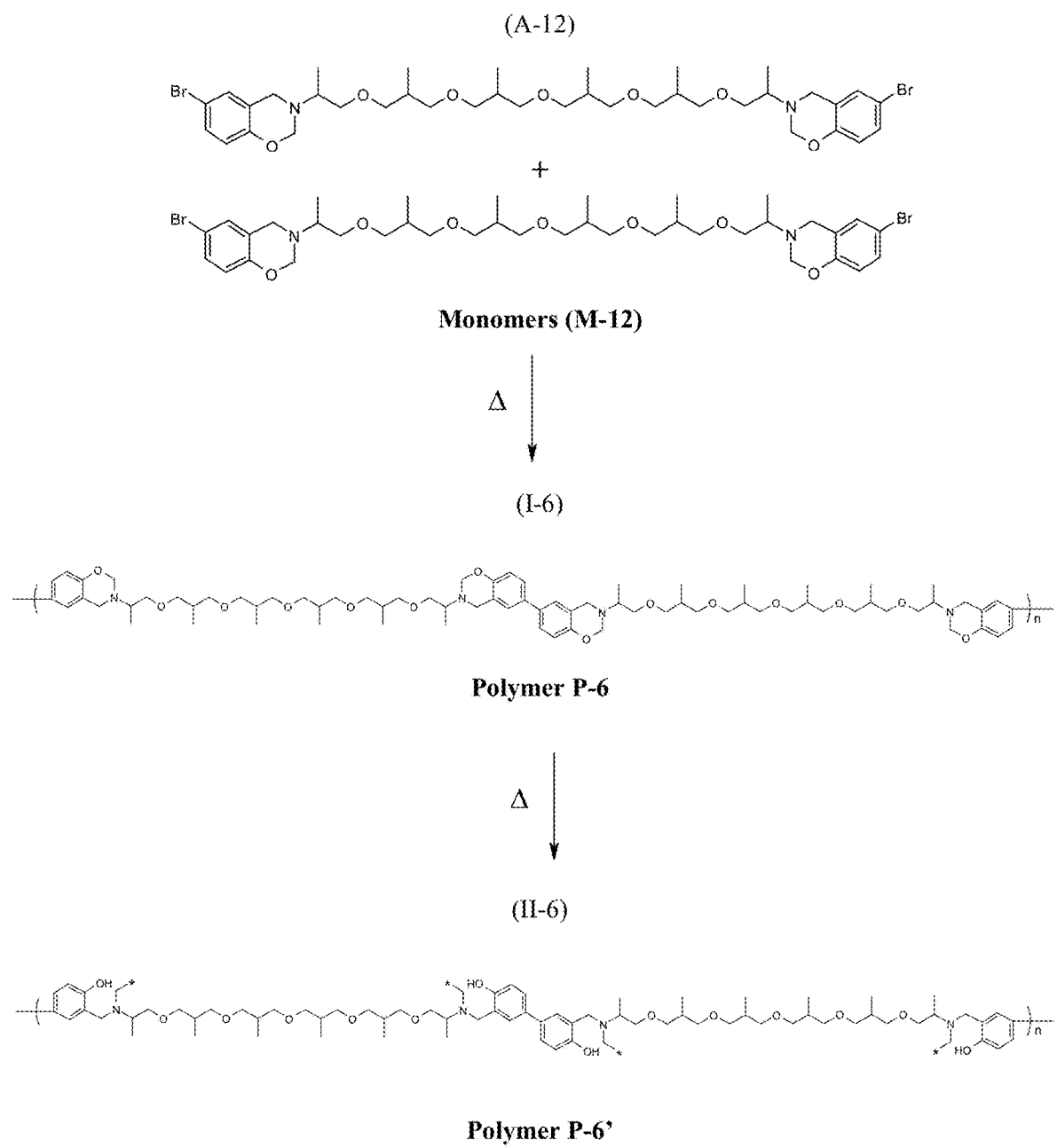

FIG. 20 represents the scheme for the synthesis of another particular polybenzoxazine according to the invention (Polymer denoted by P-6), starting from the sole particular halogenated benzoxazine of formula (A-12) (Monomer M-12), and also the structure of this polymer once the oxazine rings thereof have been opened (Polymer denoted by P-6').

Figure 21:
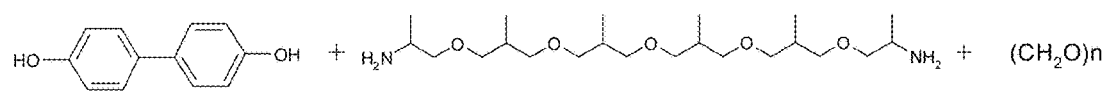
Figure 21:
Figure 21:
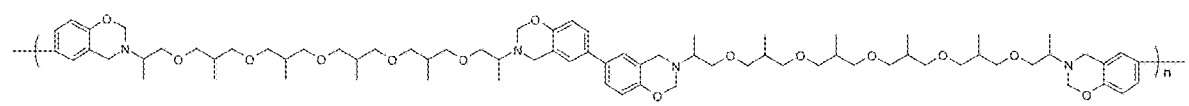

Another scheme for obtaining the Polymer P-6 above is represented in FIG. 21, this time by direct synthesis (starting from the compounds 3, 4 and 5) i.e. without passing through the preceding Monomer M-12 (FIG. 21); this figure will be commented upon in detail later on.

Lastly, FIG. 22 represents another example of a scheme for the synthesis (copolymerization) of another particular polybenzoxazine according to the invention (Polymer denoted by P-7), starting from the preceding brominated benzoxazine of formula (A-11) (Monomer M-11) and from the preceding benzoxazine, itself also brominated, of formula (A-12) (Monomer M-12), and also the structure of this polymer once the oxazine rings thereof have been opened (Polymer denoted by P-7').

Typically, the polybenzoxazine of the invention may comprise from ten to several hundred, preferably from 50 to 300 structural units having units of formula (I) and/or (II), in particular structural units as represented as examples in FIGS. 10 to 14, 17 and 18 and 20 to 22.

The polybenzoxazine of the invention can advantageously be used, as adhesion primer or as sole adhesive layer, for coating a metal substrate, at the very least a substrate at least the surface of which is at least partially metallic, and adhering in particular this substrate to rubber.

The invention also relates to such a substrate, in particular made of steel such as a carbon steel. The steel could be bright (i.e. uncoated) steel, or else may be coated at least partially with at least one layer (therefore intermediate layer, positioned between steel and polybenzoxazine layer) of a second metal, referred to as surface metal, selected from the group consisting of aluminium, copper, zinc and alloys of at least one of these metals with at least one other metal (which may or may not belong to this group). This surface metal is in particular brass.

In order to adhere the rubber to the polybenzoxazine layer, use could be made of any known adhesive system. Use will be made for example of a conventional textile adhesive of "RFL" type comprising at least one diene elastomer such as natural rubber, or any equivalent adhesive known for imparting satisfactory adhesion between rubber and conventional polymers such as polyester or polyamide, such as for example the adhesive compositions described in the patent applications WO 2013/017421, WO 2013/017422, WO 2013/017423, WO 2015/007641, WO 2015/007642.

Before the above adhesive coating process, it might be advantageous to activate the surface of the polymer of the invention, for example physically and/or chemically, to improve the adhesive uptake thereof and/or the final adhesion thereof to the rubber. A physical treatment could consist, for example, of a treatment by radiation such as an electron beam, or by plasma; a chemical treatment could consist, for example, of prior passage through a bath of epoxy resin and/or isocyanate compound.

A person skilled in the art will readily understand that the connection between the metal substrate provided with its polybenzoxazine layer and the rubber layer with which it is in contact will be definitively provided during the final curing (crosslinking) of the rubber article in question.

5. EXEMPLARY EMBODIMENTS OF THE INVENTION

The following tests describe in detail examples of the synthesis of benzoxazine compounds (Monomers M-70 and M-12) and of polybenzoxazines (Polymers P-4 and P-6) according to the invention. Lastly, adhesion tests are carried out in order to illustrate the excellent adhesive performance of the polybenzoxazines of the invention.

Generally, before any (monomer or polymer) synthesis, the apparatus used is dried under vacuum (50 mbar) at at least 100° C. (hot air gun) for at least 5 min, then cooled to room temperature (20° C.) and placed continuously under a stream of inert gas (nitrogen). All the products used are initially weighed and handled under an argon atmosphere in a glove box, then transferred under a stream of argon into the reaction flask.

5.1. Synthesis of a Halogenated Benzoxazine Compound (Monomer M-8)

The synthesis is carried out according to the procedure depicted in FIG. 15, as explained in detail below, starting from three compounds: a halogenated phenol (compound 1; 4-bromophenol; Aldrich product "B75808"), an aliphatic diamine (compound 2; 1,8-diaminooctane; Aldrich product "D22401") and a p-formaldehyde (compound 3; Aldrich "158127" product), in the presence of two solvents (anhydrous toluene and anhydrous ethanol).

For this synthesis, a 250-ml three-neck round-bottomed flask, equipped with a thermometer, a nitrogen inlet, a magnetic stirrer and a condenser is provided. Compound 1 (2 eq; 10.38 g, i.e. 60 mmol) then ethanol (51 ml) are poured into the round-bottomed flask. The presence of ethanol is important here, preventing the formation of an unstable triazine-type intermediate product. While stirring, compound 2 (1 eq; 4.32 g, i.e. 30 mmol), compound 3 (4 eq; 3.60 g, i.e. 120 mmol) and finally the toluene (102 ml) are then introduced. The reaction medium is heated (around 75° C.) at reflux for 72 h, then placed on a rotary evaporator, at 50° C. under vacuum (50 mbar), to evaporate the solvents. A lemon-yellow-coloured oil is thus obtained.

This oil then undergoes a first purification on an $SiO_2$ column, with the aid of a diethyl ether/cyclohexane eluent, in a volume ratio of the two solvents that varies from 10:35 (initial) to 10:20 (final). The purified fractions containing the monomer (M-10) are recombined and the solvents are evaporated. A light yellow solid is thus obtained. The latter is placed in methanol (1 g per 80 ml) and heated at reflux (65° C.) for 30 min. The solution is then left to cool to ambient temperature (around 20° C.) for crystallization of the monomer. The solid product obtained is isolated by filtration (Buchner filter). White-coloured crystals are thus obtained, which are dried in a vacuum oven at 50° C., overnight, to eliminate any trace of solvent (reaction yield of around 60%).

The $^1$H NMR spectrum (500 MHz) of the Monomer M-10 thus synthesized, dissolved in $CD_2Cl_2$, is reproduced in the appended FIG. 16. This NMR analysis gives the following results:

$^1$H MMR (500 MHz) $CD_2Cl_2$: 1.29 (m, 8H); 1.51 (m, 4H); 2.67 (m, 4H); 3.92 (s, 4H); 4.82 (s, 4H); 6-62-6-64-(d, 2H); 7.08 (s, 2H); 7.17-7.19 (d, 2H).

5.2. Synthesis of a Polybenzoxazine (Polymer P-4)

This synthesis is carried out according to the procedure depicted in the FIG. 17, as described in detail below, starting from the sole benzoxazine monomer obtained in the preceding step (Monomer M-10); this being in the presence of 2,2'-bipyridyl (Sigma Aldrich product "D216305"); 1,5-cyclooctadiene (Sigma Aldrich "246050"); [bis(1,5-cyclooctadiene)nickel(0)], Ni(COD)2 (Sigma Aldrich "244988"); anhydrous solvents: toluene (Sigma Aldrich "179418") and N,N-dimethylformamide (DMF, Acros product ref. "348431000"). The monomer M-10 was dried beforehand under vacuum at 40° C., overnight.

The synthesis is carried out in a 50-ml four-neck round-bottomed flask, equipped with a nitrogen inlet, a thermometer, a magnetic stirrer and a condenser and a distillation bridge (provided with a heating mantle). Firstly 2,2'-bipyridyl (61.08 mg i.e. 0.391 mmol), and next 1,5-cyclooctadiene (27.8 mg i.e. 0.257 mmol) and the catalyst Ni(COD)$_2$ (103.75 mg i.e. 0.377 mmol) are introduced into the round-bottomed flask. Added next are 15 ml of DMF with stirring, then 5 ml of toluene. Everything is purged under $N_2$ for 5 min and the reaction medium is heated to 80° C. for 30 min. Finally, the Monomer M-10 (0.2 g i.e. 0.377 mmol) of formula (A-10) is added with stirring. Everything is left to react at 80° C. for 72 h. The volatile products of the reaction mixture are then distilled at 80° C. (under 50 mbar); the polymer obtained is washed 3 times in 20 ml of an acetone/methanol (1:1) mixture, isolated by filtration (Buchner funnel), washed again with 20 ml of distilled water and finally dried under vacuum at 80° C. overnight (around 12 h).

The Polymer P-4 from FIG. 17 was thus obtained, as attested to by the ATR FTIR (Attenuated Total Reflection; Fourrier Transform Infrared Spectroscopy) analysis, which revealed typical transitions at the following frequencies [in $cm^{-1}$]:

2847.6; 1609.9; 1483.8; 1435.9; 1220.2; 1114.8; 1018.0; 926.3; 813.5; 438.7.

To be thorough, it was observed that such a polymerization of the Monomer M-10 to Polymer P-4 was accompanied by the complete disappearance, relative to the corresponding spectrum of the Monomer M-10, of the peaks initially present at the frequencies (in $cm^{-1}$) of 608.6; 740.8; 850.5 and 1170.1, whilst the peaks at 915.5 and 1475.3 were shifted respectively to 926.3 and 1483.8.

This Polymer P-4, in the form of a beige-coloured powder, was also analyzed by DSC (Differential Scanning Calorimetry) between −80° C. and +250° C. with a ramp of 10° C./min (Mettler Toledo DSC "822-2" apparatus; nitrogen atmosphere): the analysis revealed, in the first pass between −80° C. and +250° C., an exothermicity (corresponding to the opening of the oxazine rings and to the crosslinking of the polymer) above 200° C., with a maximum at around 230° C. During the second and third DSC passes, still conducted between −80° C. and +250° C., no glass transition (Tg) was visible, which attests to the very high thermal stability of the polymer of the invention.

5.3. Synthesis of Another Halogenated Benzoxazine Compound (Monomer M-12)

The synthesis is carried out according to the procedure depicted in FIG. 19 as explained in detail below, starting from three compounds: a halogenated phenol (compound 1; 4-bromophenol; Aldrich product "B75808"), an aliphatic polyether diamine (compound 4; a poly(propylene glycol) bis(2-aminopropyl ether) (Mn equal to 400; Aldrich product "406678") and a p-formaldehyde (compound 3; Aldrich product "158127"), in the presence of two solvents (anhydrous toluene and anhydrous ethanol).

As before, for this synthesis, a 250-ml three-neck round-bottomed flask, equipped with a thermometer, a nitrogen inlet, a magnetic stirrer and a condenser is provided. Compound 1 (2 eq; 10.49 g i.e. 60 mmol) then ethanol (51 ml) are poured into the round-bottomed flask. While stirring, compound 4 (1 eq; 12.62 g i.e. 30 mmol), compound 3 (4 eq; 3.79 g i.e. 120 mmol) and finally the toluene (102 ml) are then introduced. The reaction medium is heated at reflux (around 75° C.) for 48 h, then placed under vacuum (1 mbar) at 110° C. for 30 min to ensure the evaporation of the volatile products. An orange-coloured viscous liquid is thus obtained. No trace of free bromophenol compound was detected by FTIR spectroscopy in the reaction product.

The $^1$H NMR spectrum (500 MHz) of the Monomer M-12 thus synthesized, dissolved in $CD_2Cl_2$, confirmed its chemical structure, this NMR analysis giving the following results:

$^1$H MMR (500 MHz) $CD_2Cl_2$: 1.12 (s, 24H); 3.10 (s, 2H); 3.31-3.56 (m, 24H); 4.04 (s, 4H); 4.93 (s, 4H); 6.61-6.63 (d, 2H); 7.08 (s, 2H); 7.17-7.18 (d, 2H).

5.4. Synthesis of Another Polybenzoxazine (Polymer P-6)

This synthesis is carried out according to the procedure depicted in FIG. 20, as described in detail below, starting from the sole benzoxazine monomer (Monomer M-12) obtained in the preceding step, this being in the presence of 2,2'-bipyridyl (Sigma Aldrich product "D216305"); 1,5-cyclooctadiene (Sigma Aldrich "246050"); bis(1,5-cyclooctadiene)nickel(0), Ni(COD)$_2$ (Sigma Aldrich "244988"); anhydrous solvents: toluene (Sigma Aldrich "179418") and N,N-dimethylformamide (DMF, Acros Organics product "348431000"). The monomer M-12 was dried beforehand under vacuum at 60° C. overnight (around 12 h).

The synthesis is carried out in a 50-ml four-neck round-bottomed flask, equipped with a nitrogen inlet, a thermometer, a magnetic stirrer, a condenser and a distillation bridge (provided with a heating mantle). Firstly the compound 2,2'-bipyridyl (610.8 mg i.e. 3.91 mmol), and next 1,5-cyclooctadiene (278 mg i.e. 2.57 mmol) and the catalyst Ni(COD)$_2$ (1.04 g i.e. 3.77 mmol) are introduced into the round-bottomed flask, all these products being transferred under a stream of argon into the reaction flask. Added next are 150 ml of DMF with stirring, then 50 ml of toluene.

Everything is purged under $N_2$ for 5 min and the reaction medium is heated to 80° C. (30 min). Finally, the Monomer M-12 (3.07 g i.e. 3.77 mmol) of formula (A-12) is added with stirring. Everything is left to react at this temperature for 72 h.

The volatile products of the reaction mixture are then distilled at 80° C. (under 50 mbar); the polymer obtained is washed 3 times in 20 ml of an acetone/methanol (1:1) mixture, isolated by filtration (Buchner funnel), and finally dried under vacuum at 60° C. overnight (around 12 h).

The $^1$H NMR spectrum (500 MHz) of the Polymer P-6 thus synthesized, dissolved in $CD_2Cl_2$, confirmed its chemical structure, this NMR analysis giving the following results:

$^1$H MMR (500 MHz) $CD_2Cl_2$: 1.08 (m, 18H); 3.36 (s, 2H); 3.41-3.56 (m, 24H); 4.09 (s, 4H); 4.95 (s, 4H); 6.74-6.76 (d, 2H); 7.12 (s, 2H); 7.23-7.24 (d, 2H).

5.5. Another Example of the Synthesis of the Polymer P-6

During an additional test, the preceding polymer P-6 was obtained by a process of direct synthesis, without this time passing through the Monomer M-12.

For this synthesis, a 250-ml three-neck round-bottomed flask, equipped with a thermometer, a nitrogen inlet, a magnetic stirrer and a condenser is provided. The synthesis was carried out according to the procedure depicted in FIG. 21, as explained in detail below, starting from three compounds: an aromatic diphenol (compound 5; 4,4'-dihydroxybiphenyl; Aldrich product "168734"), a poly(propylene glycol) bis(2-aminopropylether) (compound 4) and the p-formaldehyde (compound 3; Aldrich product "158127"), in the presence of two solvents (anhydrous toluene and anhydrous ethanol).

Compound 5 (1 eq; 3.84 g i.e. 20 mmol) then ethanol (34 ml) are poured into the round-bottomed flask. While stirring, compound 4 (1 eq; 8.41 g i.e. 20 mmol), compound 3 (4 eq; 2.40 g i.e. 80 mmol) and finally the toluene (68 ml) are then introduced. The reaction medium is heated (around 75° C.) at reflux for 24 h, then placed on a rotary evaporator, at 50° C. under vacuum (50 mbar) to evaporate the solvents. A lemon-yellow-coloured viscous oil is thus obtained.

The $^1$H NMR spectrum (500 MHz) of the Polymer P-6 thus synthesized, dissolved in $CD_2Cl_2$, confirmed its chemical structure, this NMR analysis giving the following results:

$^1$H MMR (500 MHz) $CD_2Cl_2$: 1.09 (m, 18H); 3.36 (s, 2H); 3.41-3.56 (m, 24H); 4.09 (s, 4H); 4.94 (s, 4H); 6.74-6.75 (d, 2H); 7.12 (s, 2H); 7.23-7.24 (d, 2H).

5.6. Test of Adhesion in a Metal/Rubber Composite

A portion (650 mg) of the Polymer P-6 previously prepared was dissolved in 8 ml of toluene, in order to form a slightly yellow transparent solution, a fraction (0.7 ml) of which was then deposited uniformly on a brass tape (film) having dimensions of 10 cm×2.5 cm and a thickness of 0.3 mm. The assembly was placed in an oven at 175° C. (with air ventilation) for 5 min under vacuum (50 mbar) (change to bright yellow), then an additional 2.5 min at 230° C. under air in order to at least partially open (i.e. completely or partially open) the oxazine rings of the polymer, this last step being accompanied by a pronounced change in the colour of the polymer, which changes from bright yellow to a brown colour. After cooling to ambient temperature, the tape provided at the surface with its thin (5 to 10 μm thick) layer of polybenzoxazine thus formed, was then coated by brush with an aqueous composition of RFL adhesive (around 81% by weight of water) based on resorcinol (around 2%), on formol (around 1%) and on a rubber latex (around 16% of NR, SBR and VP-SBR rubbers). It was dried for 30 s; at 80° C. in order to eliminate the water, then treated in an oven for 2.5 min at 230° C.

The brass tape thus coated with the polybenzoxazine film then coated with adhesive, was subsequently placed between two layers of conventional rubber composition for a belt reinforcement of a passenger vehicle tyre, said composition based on natural rubber, on carbon black and silica as filler and on a vulcanization system (sulfur and sulfenamide accelerator); this composition being devoid of cobalt salt. The metal/rubber composite test specimen thus prepared was then placed under a press and everything was cured (vulcanized) at 165° C. for 15 min under a pressure of 20 bar. After vulcanization of the rubber, excellent adhesive bonding between the rubber matrix and metal tape was obtained, despite the absence of cobalt salt in the rubber matrix; this is because, during peel tests (at 20° C.), it was found that the failure occurred systematically in the rubber matrix itself and not at the interface between metal and rubber.

Other adhesive bonding tests were carried out on a(n) (uncoated) bright steel tape; they too revealed an excellent adhesion to the rubber (systematic failure in the rubber matrix).

In conclusion, the polybenzoxazine according to the invention offers the metallic substrates the major advantage of being able subsequently to be adhesively bonded to rubber matrices using simple textile adhesives, such as RFL adhesives, or else directly (that is to say, without employing such adhesives) to these rubber matrices, for example when the latter contain appropriate functionalized unsaturated elastomers, such as epoxidized elastomers.

Thus, use may be made of metal substrates optionally coated with adhesive metal layers such as brass, and also surrounding rubber matrices devoid of metal salts, in particular of cobalt salts.

Moreover, this constituting a significant advantage compared to the other known polymers described in the introduction to the present document, polybenzoxazines of the invention have the remarkable ability, at high temperature, to open their oxazine rings and to thus result in a thermosetting polyphenolic resin structure. This gives them a better thermal stability, with no visible phase transition at temperatures above 200° C. Lastly, their specific microstructure makes it possible, very advantageously, to adjust the flexibility of the molecule depending on the particular applications targeted.

The invention claimed is:

1. A polybenzoxazine, the repeat units of which comprise at least one unit corresponding to the formula (I) or (II):

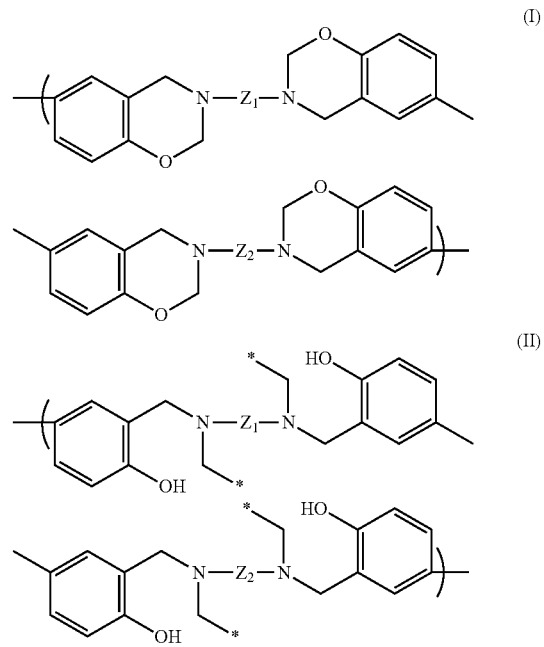

wherein $Z_1$ and $Z_2$ are different one of $Z_1$ and $Z_2$ represents an aliphatic group comprising from 1 to 20 carbon atoms or a cycloaliphatic group comprising from 3 to 20 carbon atoms, and optionally at least one heteroatom chosen from O, S, N and P, and the other of $Z_1$ and $Z_2$ represents an aromatic group comprising from 6 to 30 carbon atoms, and optionally at least one heteroatom chosen from O, S, N and P.

2. The polybenzoxazine according to claim 1, wherein the one of $Z_1$ and $Z_2$ represents an alkylene group comprising from 1 to 20 carbon atoms, and optionally at least one heteroatom chosen from O, S, N and P.

3. A polybenzoxazine, the repeat units of which comprise at least one unit corresponding to the formula (I) or (II):

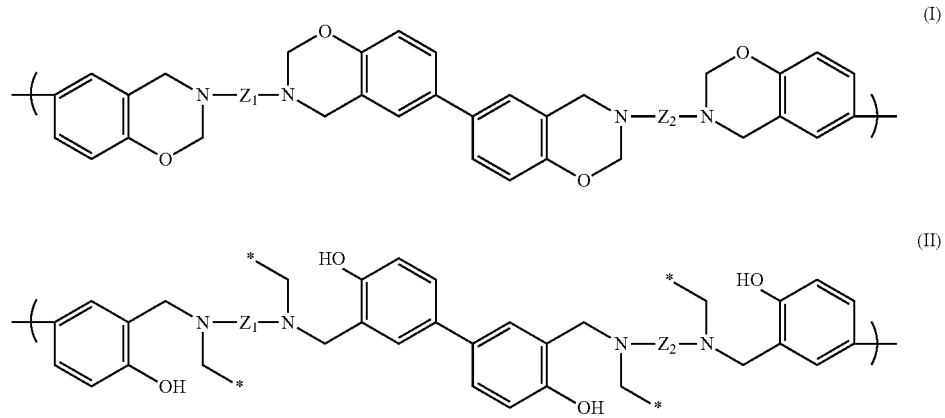

wherein one of $Z_1$ and $Z_2$ comprises a group selected from the group consisting of —$(CH_2)_x$—, —$CH_2$-Ph-$CH_2$—, —$(CH_2$—$CH_2$—$X)_n$— and —$(CH(CH_3)$—$CH_2$—$X)_n$—, wherein x and n are integers from 1 to 20, Ph represents a benzene ring, and X represents at least one heteroatom chosen from oxygen, sulfur, nitrogen and phosphorus, and wherein the other of $Z_1$ and $Z_2$ represents an aromatic group comprising from 6 to 30 carbon atoms, and optionally at least one heteroatom chosen from O, S, N and P.

4. A coating for a substrate, at least the surface of which is at least partially metallic, comprising a polybenzoxazine, the repeat units of which comprise at least one unit corresponding to the formulae (I) or (II):

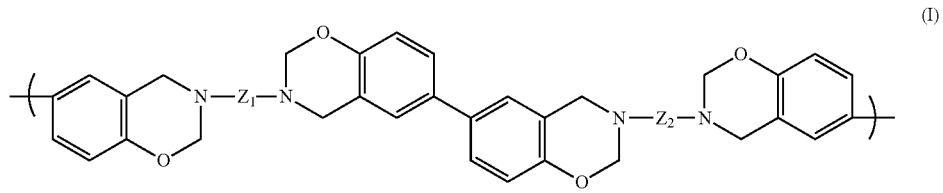

(I)

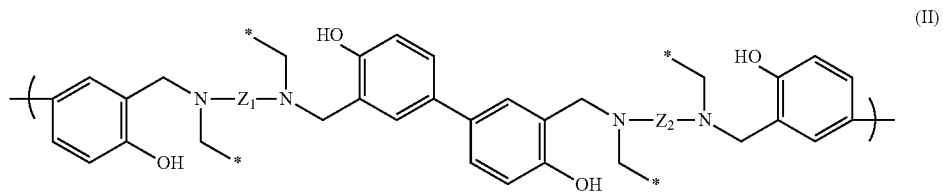

(II)

wherein $Z_1$, $Z_2$, or both $Z_1$ and $Z_2$, which are identical or different, represent an aromatic group comprising from 6 to 30 carbon atoms, and optionally at least one heteroatom chosen from O, S, N and P, and wherein, when $Z_1$ and $Z_2$ are different, one of $Z_1$ and $Z_2$ is as defined above and one of $Z_1$ and $Z_2$ represents an at least divalent, aliphatic, cycloaliphatic or aromatic bonding group comprising at least one carbon atom and optionally at least one heteroatom selected from O, S, N and P.

5. A method of bonding metal to rubber comprising:
coating a substrate, at least the surface of which is at least partially metallic, with a substrate coating comprising a polybenzoxazine, the repeat units of which comprise at least one unit corresponding to the formulae (I) or (II):

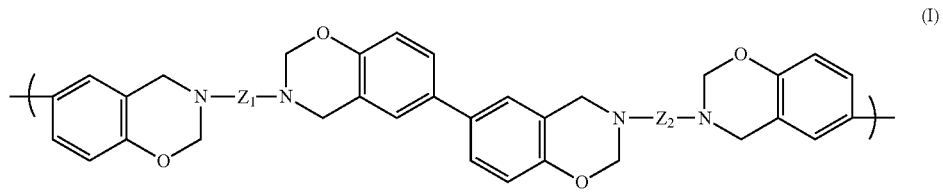

(I)

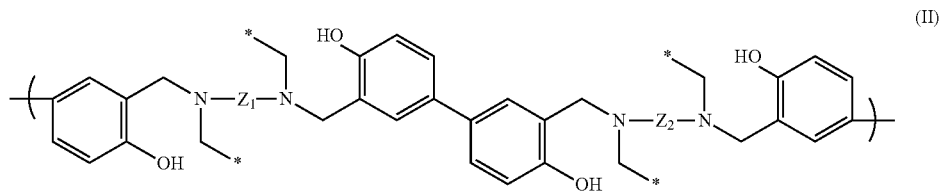

(II)

wherein $Z_1$, $Z_2$, or both $Z_1$ and $Z_2$, which are identical or different, represent an aromatic group comprising from 6 to 30 carbon atoms, and optionally at least one heteroatom chosen from O, S, N and P, and wherein, when $Z_1$ and $Z_2$ are different, one of $Z_1$ and $Z_2$ is as defined above and one of $Z_1$ and $Z_2$ represents an at least divalent, aliphatic, cycloaliphatic or aromatic bonding group comprising at least one carbon atom and optionally at least one heteroatom selected from O, S, N and P.

6. A substrate, at least the surface of which is at least partially metallic, wherein the at least partially metallic portion is coated with a polybenzoxazine, the repeat units of which comprise at least one unit corresponding to the formulae (I) or (II):

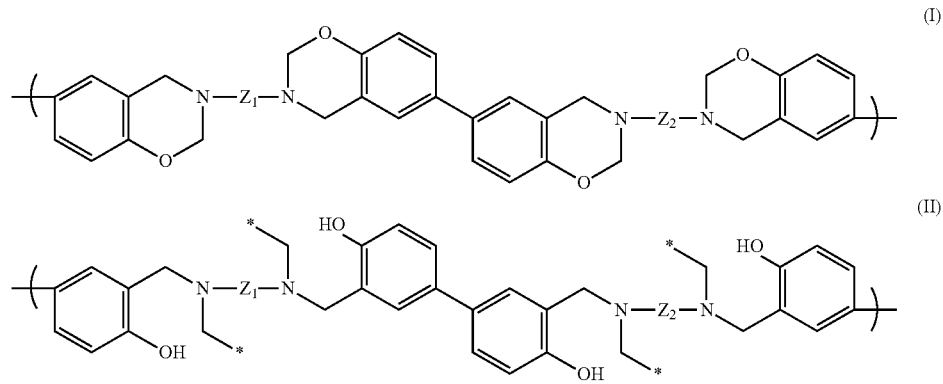

wherein $Z_1$, $Z_2$, or both $Z_1$ and $Z_2$, which are identical or different, represent an aromatic group comprising from 6 to 30 carbon atoms, and optionally at least one heteroatom chosen from O, S, N and P, and wherein, when $Z_1$ and $Z_2$ are different, one of $Z_1$ and $Z_2$ is as defined above and one of $Z_1$ and $Z_2$ represents an at least divalent, aliphatic, cycloaliphatic or aromatic bonding group comprising at least one carbon atom and optionally at least one heteroatom selected from O, S, N and P.

7. The substrate according to claim 6, wherein the substrate is made of steel.

8. The substrate according to claim 7, wherein the substrate is made of carbon steel.

9. The substrate according to claim 7, wherein the steel is a bright steel.

10. The substrate according to claim 7, wherein the steel is at least partially coated with at least one layer of a second metal selected from the group consisting of aluminium, copper, zinc and alloys of at least one of these metals.

11. The substrate according to claim 10, wherein the at least one layer of a second metal comprises brass.

\* \* \* \* \*